US008868642B2

(12) United States Patent
Gilboa

(10) Patent No.: US 8,868,642 B2
(45) Date of Patent: Oct. 21, 2014

(54) SYSTEM AND METHOD FOR DYNAMICALLY SWITCHING BETWEEN MOUSE MODES

(75) Inventor: Arnon Gilboa, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 690 days.

(21) Appl. No.: 12/832,873

(22) Filed: Jul. 8, 2010

(65) Prior Publication Data

US 2012/0011193 A1    Jan. 12, 2012

(51) Int. Cl.
*G06F 15/16*    (2006.01)
(52) U.S. Cl.
USPC ........... 709/203; 709/224; 709/246; 715/740; 715/781; 718/1; 345/473
(58) Field of Classification Search
USPC .................. 709/203, 224, 246; 715/740, 781; 718/1; 345/473
See application file for complete search history.

(56) References Cited

U.S. PATENT DOCUMENTS

| 6,507,845 | B1 | 1/2003 | Cohen et al. | |
|---|---|---|---|---|
| 6,710,790 | B1 | 3/2004 | Fagioli | |
| 7,114,018 | B1 * | 9/2006 | Maity et al. | 710/72 |
| 7,453,473 | B2 | 11/2008 | Stall | |
| 2006/0139330 | A1 | 6/2006 | Kutch et al. | |
| 2007/0174784 | A1 | 7/2007 | Yu et al. | |
| 2007/0288640 | A1 * | 12/2007 | Schmieder | 709/227 |
| 2008/0082976 | A1 | 4/2008 | Steinwagner et al. | |
| 2008/0201644 | A1 * | 8/2008 | Partani et al. | 715/740 |
| 2009/0044252 | A1 | 2/2009 | Kashima | |
| 2009/0100250 | A1 * | 4/2009 | Chen et al. | 712/43 |
| 2009/0210817 | A1 | 8/2009 | Schmieder et al. | |
| 2009/0282359 | A1 * | 11/2009 | Saul et al. | 715/784 |
| 2010/0100652 | A1 | 4/2010 | Lin et al. | |
| 2010/0269135 | A1 * | 10/2010 | Hulse et al. | 725/37 |
| 2011/0153435 | A1 * | 6/2011 | Pisaris-Henderson | 705/14.73 |
| 2012/0011280 | A1 | 1/2012 | Gilboa | |
| 2012/0011445 | A1 | 1/2012 | Gilboa | |

OTHER PUBLICATIONS

Microsoft MSDN Library, "Remote Desktop Protocol", Build date Oct. 19, 2009, 2 pages, Microsoft Corporation, date of access Oct. 27, 2009, http://msdn.microsoft.com/en-us/library/aa383015(VS.85).aspx.
Red Hat Office Action for U.S. Appl. No. 12/832,883, mailed Jun. 18, 2012.
Red Hat Office Action for U.S. Appl. No. 12/832,888, mailed Aug. 14, 2012.
Red Hat Office Action for U.S. Appl. No. 12/832,888, mailed Dec. 28, 2012.

* cited by examiner

*Primary Examiner* — Hitesh Patel
(74) *Attorney, Agent, or Firm* — Lowenstein Sandler LLP

(57) ABSTRACT

A local computing device determines that multiple mouse modes are supported by both the local computing device and a remote computing device with which the local computing device is connected. The mouse modes are connection protocols for a cursor connection, the connection protocols identifying when to send cursor messages between the local computing device and the remote computing device as well as what types of information to include in the cursor messages. The local computing device detects one or more parameters of the connection between the local computing device and the remote computing device. When the one or more parameters satisfy a first criterion, the local computing device sets a first mouse mode for a cursor connection between the local computing device and the remote computing device. When the one or more parameters fail to satisfy the first criterion, the local computing device sets a second mouse mode for the cursor connection.

23 Claims, 14 Drawing Sheets

SYSTEM AND METHOD FOR DYNAMICALLY SWITCHING BETWEEN MOUSE MODES

RELATED APPLICATIONS

The present application is related to U.S. patent application Ser. No. 12/832,883, filed Jul. 8, 2010 and entitled, "Remote Computing With A Low Latency Mouse Mode", and U.S. patent application Ser. No. 12/832,888, filed Jul. 8, 2010 and entitled, "Method And System For Transforming Cursor Graphics Information", which are hereby incorporated by reference herein in their entirety.

TECHNICAL FIELD

The embodiments of the invention relate generally to modes for use in remote computing and, more specifically, relate to dynamically switching between different mouse modes.

BACKGROUND

A remote desktop service enables a client to access applications and data on a remote computer over a network. Using a remote desktop service, a remote desktop of a remote server computer can be interacted with on a local client computer. Input data received from a mouse and keyboard connected to the client is sent to the remote server to control the remote desktop. However, existing protocols for sending the mouse data have a high latency.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1A:
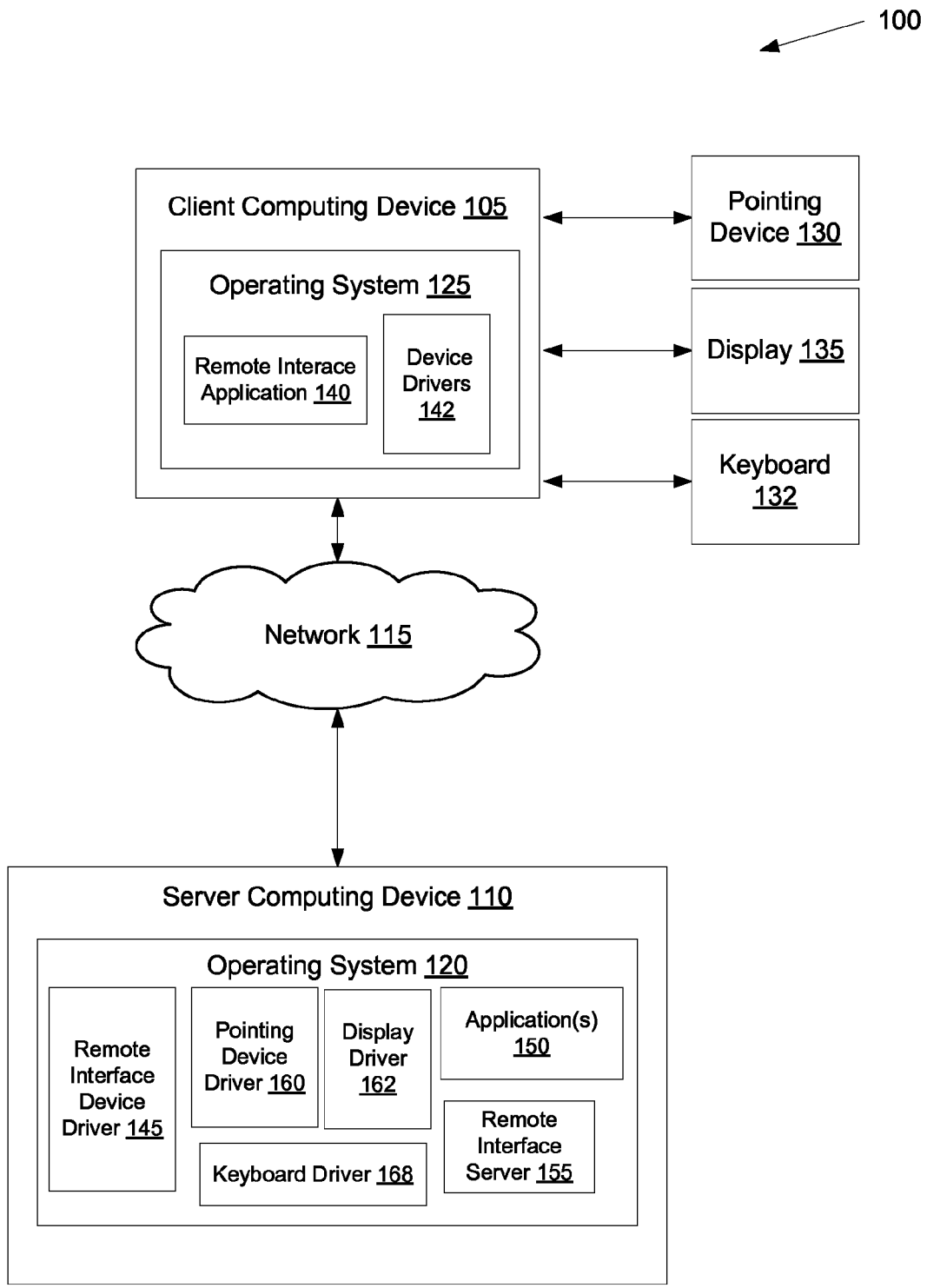
FIG. 1A is a block diagram of a computing system, in which embodiments of the invention may operate.

A method and system for dynamically switching between multiple mouse modes are disclosed. In one embodiment, a local computing device determines that multiple mouse modes are supported by both the local computing device and a remote computing device with which the local computing device is connected. The mouse modes are connection protocols for a cursor connection, the connection protocols identifying when to send cursor messages between the local computing device and the remote computing device as well as what types of information to include in the cursor messages. The mouse modes may include, for example, a server mouse mode and a client mouse mode. The local computing device detects one or more parameters of the connection between the local computing device and the remote computing device, such as network bandwidth, latency, connection type, connection protocols, time, etc. When the one or more parameters satisfy a first criterion, the local computing device sets a first mouse mode for a cursor connection between the local computing device and the remote computing device. When the one or more parameters fail to satisfy the first criterion, the local computing device sets a second mouse mode for the cursor connection.

In the following description, numerous details are set forth to provide a more thorough explanation of the embodiments of the present invention. It will be apparent, however, to one skilled in the art, that the present invention may be practiced without these specific details. In some instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "moving", "transmitting", "switching", "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1A is a block diagram of a computing system 100, in which embodiments of the invention may operate. The computing system 100 includes a server computing device (server) 110 connected to a client computing device (client) 105 via a network 115. Network 115 may be a private network (e.g., a local area network (LAN), a wide area network (WAN), etc.) or a public network (e.g., the Internet), and may be a combination of one or more networks.

Server 110 may be a desktop computer, rackmount server, mainframe, super computer, or other computing device. Server 110 may be a single machine or a cluster of multiple machines. Server 110 includes an operating system (OS) 120, which may be a Windows OS, a Linux OS, a Unix OS, or some other operating system. Installed on the operating system 120 are one or more applications 150. The applications 150 may include, for example, a word processing application, a presentation application, a spreadsheet application, or any other application.

The OS 120 further includes multiple device drivers, each of which enables the operating system 120 to communicate with and/or control a particular type of device or devices. The device drivers may include, for example, a keyboard driver 168 for communicating with a keyboard, a display driver 162 for communicating with a graphics device such as a graphics card and a pointing device driver 160 for communicating with a computer mouse, a tablet device, or other pointing device. In one embodiment, each of these device drivers communicates with and/or controls a remote device attached to client 105. In another embodiment, the device drivers include a remote interface driver 145 that enables OS 120 and applications 150 to be displayed on, and controlled by, client 105. The remote interface driver 145 may operate in concert with the keyboard driver 168, pointing device driver 160 and/or display driver 162 to receive cursor messages and keyboard messages from client 105 and to provide graphics messages to client 105. Alternatively, the remote interface driver 145 may itself act as a pointing device driver (e.g., a mouse driver), a keyboard driver and/or a display driver. For example, the remote interface driver 145 may send cursor messages and keyboard messages received from client 105 to applications 150 and the OS 120 as though the remote interface driver 145 were a standard pointing device driver 160 or keyboard driver. The remote interface driver 145 may also receive graphics information (e.g., rendering information) from a local graphics device (not shown) or display driver 162, and forward the graphics information to a remote interface server 155 for transmittal to client 105. In one embodiment, the remote interface driver 145 is a collection of multiple remote interface drivers, each of which performs a different task or tasks.

In one embodiment, the remote interface server 155 is part of the OS 120. The remote interface server 155 listens for connections from clients such as client 105. When a client (e.g., client 105) connects to the remote interface server 155, the remote interface server 155 generates a new session for that client 105, and executes the remote interface driver 145 or drivers. The remote interface server 155 may receive keyboard and mouse input from client 105 over the network connection, and present these inputs to the operating system 120 and applications 150 via the remote interface device driver 145. The remote interface driver 145 may further capture user interface rendering calls (or other graphics information), which the remote interface server 155 transmits to the client 105 over a remote interface connection (e.g., Simple Protocol for Independent Computing Environments (SPICE™) or remote desktop protocol (RDP)). This entire procedure is transparent to the applications 150.

Client 105 may be a desktop computer, laptop computer, personal digital assistant (PDA), mobile phone, or other computing device. Client 105 includes an operating system 125, which may be, for example, the Windows operating system, a Linux operating system, or some other operating system. Operating system 125 may be the same or different from operating system 120 that runs on the server 110.

Client 105 is connected to a pointing device 130, a display 135 and a keyboard 132. Operating system 125 includes multiple device drivers 142, which may include a pointing device driver for interfacing with the pointing device 130, a keyboard device driver for interfacing with the keyboard 132, and a display driver for interfacing with a graphics card that is connected to display 135.

Client 105 receives cursor messages from pointing device 130. Cursor messages may be cursor position messages or cursor movement messages, depending on the type of pointing device from which they are received. Cursor position messages include absolute position data (e.g., desktop coordinates), while cursor movement messages include delta position data (e.g., the horizontal and vertical change in position of the cursor). Pointing devices that provide delta position data include a computer mouse, trackball and touchpad. Pointing devices that provide absolute position data include a graphics tablet and a touchscreen. Cursor messages may include the delta position or absolute position data and button and/or wheel states (e.g., data indicating, for each button and/or wheel included in the pointing device, whether the button or wheel is depressed or otherwise used). Cursor messages that include delta position or absolute position data may cause a cursor displayed on a client desktop of the OS 125 to change position.

Operating system 125 includes a remote interface application 140 that initiates connections with remote interface server 155. Once the remote interface application 140 successfully initiates a connection, cursor movement messages, cursor command messages, keyboard messages, display messages, etc. may be communicated between the remote interface server 155 and the remote interface application 140. As operating system 120 and applications 150 generate rendering data (or other graphics commands/information), this data may be captured by the remote interface device driver 145, and communicated to the remote interface application 140 by the remote interface server 155. The remote interface application 140 may then cause the rendering data to be rendered on display 135. Remote interface application 140 may receive cursor messages input by pointing device 130 and keyboard messages input by keyboard 132. The remote interface application 140 may then transmit these messages to remote interface server 155, which may forward these messages to the remote interface device driver 145. Remote interface device driver 145 may then provide the messages to applications 150 and operating system 120 as though the messages were originated by a standard keyboard and mouse attached to server 110.

OS 125 has a client desktop that includes a client side cursor. Similarly, OS 120 has a server desktop that includes a server side cursor. When the server desktop (or a portion thereof, e.g., a window of the server desktop) is displayed on the client desktop, typically either the server side cursor or the client side cursor will be hidden. Otherwise, two cursors will be displayed on the client desktop, each of which may have different shapes and/or locations (e.g., when the server and client cursors are not synchronized). Therefore, the client side cursor or server side cursor may be hidden to avoid confusing a user.

There are multiple different mouse modes that may be used for the remote interface connection between the remote interface application 140 and the remote interface server 155. Each mouse mode is a connection protocol for a cursor connection. The mouse modes may identify when to send cursor messages between computing devices as well as what types of information to include in the cursor messages. A mouse mode that may be used is a synchronous mouse mode that is referred to herein as "server mouse mode." The server mouse mode is a preexisting mouse mode that has historically been used in the SPICE protocol. In server mouse mode, the server side cursor is displayed on the client desktop, and the client side cursor is hidden. In server mouse mode, relative mouse motion messages are sent from the client 105 to the server 110, processed by the server 110, and the resultant cursor messages are then sent from the server 110 back to the client 105. Therefore, in server mouse mode, the motion and cursor messages make a round trip before a cursor (the server side cursor) is updated on OS 125. This round trip can cause server mouse mode to experience considerable latency when used, for example, in a wide area network (WAN). Therefore, there may be a noticeable delay between when a user moves a mouse (or other pointing device) and when the displayed client desktop reflects the mouse motion.

In server mouse mode, the remote interface application 140 issues a pointing device capture command when the client side cursor is clicked within a window controlled by server 110. This causes client side cursor to be hidden, and positioned at a center of client desktop. This further causes cursor messages and keyboard messages to be captured by remote interface application 140. As cursor messages are received, remote interface application 140 may calculate delta position data (delta coordinates) from the center of the client desktop to a new desktop location to which the client side cursor has been moved, after which the client side cursor (which is hidden) is repositioned at the center of the client desktop. Remote interface application 140 then transmits a cursor movement message containing the delta position data to remote interface server 155. Keyboard messages are also sent to remote interface server 155. Remote interface server 155 forwards the information to remote interface device driver 145, which updates a cursor position of the server side cursor on the server desktop of operating system 120. After the cursor position on the server desktop is updated, a resultant cursor message is sent back to remote interface application 140 by remote interface server 155. Upon receiving this cursor message, remote interface application 140 finally updates the cursor position of the server side cursor on the client desktop.

In server mouse mode, if a user desires to use a local application (one that is not provided by server 110), the pointing device 130 needs to be manually released by the user (e.g., by pressing shift-F12). The cursor cannot be moved outside of the bounds of the window controlled by server 110 until the pointing device 130 has been released. Moreover, while the pointing device 130 is captured, no portion of a cursor may be shown outside of the window controlled by the server 110. Once the pointing device 130 is released, no cursor movement messages are sent to server 110.

In some embodiments, a low latency asynchronous mouse mode is used for the remote interface connections to overcome the above limitations of the server mouse mode. The low latency asynchronous mouse mode is referred to herein as "client mouse mode." In client mouse mode, the client side cursor is displayed on the client desktop, and the server side cursor is hidden. In client mouse mode, cursor messages (e.g., mouse position messages) are sent from client 105 to server 110. Response cursor messages then may or may not be sent from server 110 back to client 105, but these response cursor messages do not include any delta position data or absolute position data (e.g., may include only a change in cursor graphics information, like hide, show, image stetting etc.). This can reduce latency.

In client mouse mode, as input is received from pointing device 130, the input is immediately used to update a position of the client side cursor on the client desktop presented by operating system 125. A cursor position message (including absolute position data) is then sent to server 110 to notify it of the updated cursor position. The server 110 uses the received cursor position message to update a cursor position of the server side cursor on the remote desktop of operating system 120. Since the client side cursor position is updated on the client desktop of OS 125 without any confirmation or cursor messages being received from the server 110, the server side cursor location at the server desktop is not synchronized with the client side cursor position at the client desktop. By updating the client side cursor position without waiting for a response from server 110, client 105 provides minimum latency, and an improved user experience.

In client mouse mode, as opposed to server mouse mode, the pointing device 130 does not need to be captured. Nor does the keyboard 132 need to be manually captured or released. Windows within the client desktop that are controlled by server 110 register with particular coordinates in the same manner that local applications register windows with particular coordinates. When the cursor is positioned at those particular coordinates, cursor position messages are sent to the server 110. Therefore, in client mouse mode, the client side cursor is used in the same manner for windows controlled by server 110 as for windows controlled by any local application. This enables a user to freely move the cursor between windows controlled by server 110 and windows controlled by local applications without manually capturing and releasing the pointing device 130. This provides a more natural and intuitive user interface than server mouse mode. Some embodiments of the client mouse mode are described in greater detail below with reference to FIGS. 3-7B.

Figure 1B:
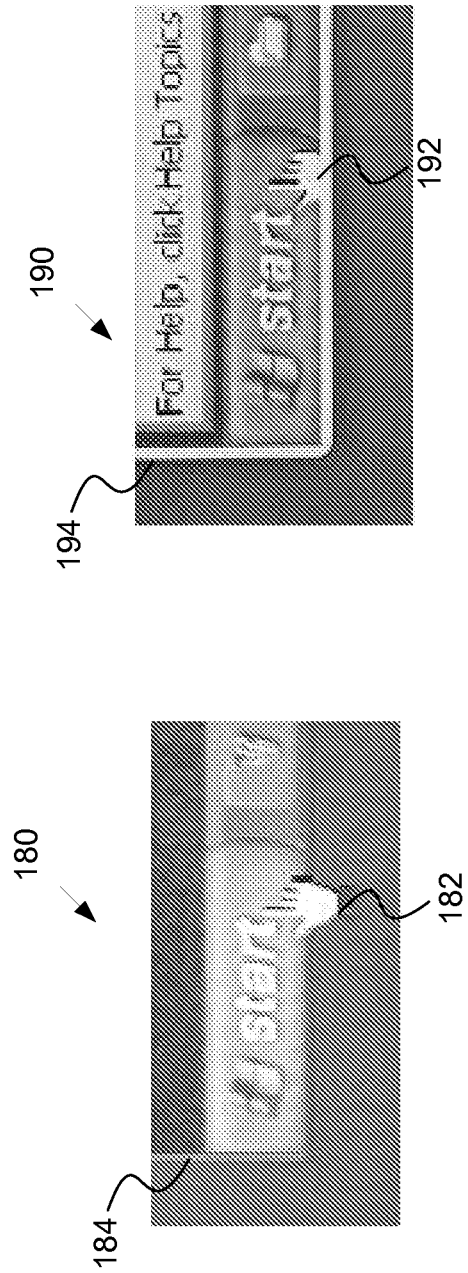
FIG. 1B illustrates a graphical comparison of a cursor displayed on a client using client mouse mode verses a cursor displayed on the client using server mouse mode, in accordance with one embodiment of the present invention.

FIG. 1B illustrates a graphical comparison of a cursor displayed on a client desktop using client mouse mode 180 versus a cursor displayed on the client desktop using server mouse mode 190, in accordance with one embodiment of the present invention. As shown, in client mouse mode, the cursor shape for the client side mouse 182 displayed in the client desktop extends outside of the boundaries of a window 184 controlled by a remote server. In contrast, in server mouse mode, the cursor shape for the server side mouse 192 displayed in the client desktop cannot extend past the boundaries of the window 194 controlled by the remote server.

Returning to FIG. 1A, in both client mouse mode and server mouse mode, cursor graphics information is sent from server 110 to client 105. Cursor graphics information may include a bitmap of the cursor, a palette) and a mask of the cursor (which identifies what areas of background are hidden by cursor, which areas are not hidden, and which areas are a combination of the cursor and the background). In one embodiment, the cursor graphics information is sent to client 105 when the cursor graphics information changes. For example, when a paint tool is selected in a drawing application that runs on OS 120, cursor graphics information for a paintbrush cursor may be sent to client 105. In another embodiment, response cursor messages sent from server 110 to client 105 may contain cursor graphics information (e.g. hide or show). Alternatively, cursor graphics information may be sent along with other graphics commands/information sent from server 110 to client 105. OS 125 uses received cursor graphics information to render the client side cursor on the client desktop when the cursor is placed over a window controlled by server 110. In client mouse mode, there may be a slight delay between when the client side cursor is positioned over the window controlled by server 110, and when the shape of the client side cursor is updated (e.g., the cursor icon is changed) to reflect cursor graphics information received from server 110. In server mouse mode, the pointing device 130 must be captured before cursor graphics information will be sent from server 110 to client 105.

When operating system 125 differs from operating system 120, cursor graphics information generated by OS 120 may not be compatible with OS 125. For example, the Windows operating system includes alpha support (a combination of textures and colors between a foreground object (e.g., a cursor) and a background object), while Linux OSes do not. Accordingly, in one embodiment, the remote interface server and/or remote interface application 140 transform the cursor graphics information to a format that is supported by the OS 125. Some embodiments of cursor graphics rendering are discussed in greater detail below with reference to FIGS. 8-10.

In one embodiment, the remote interface server 155 and/or the remote interface application 140 can dynamically switch between the server mouse mode and the client mouse mode. The server mouse mode can be dynamically switched to client mouse mode when first criteria are satisfied, and the client mouse mode can be dynamically switched to server mouse mode when second criteria are satisfied. Some embodiments of dynamic switching between mouse modes are discussed in greater detail below with reference to FIG. 11.

Figure 2:
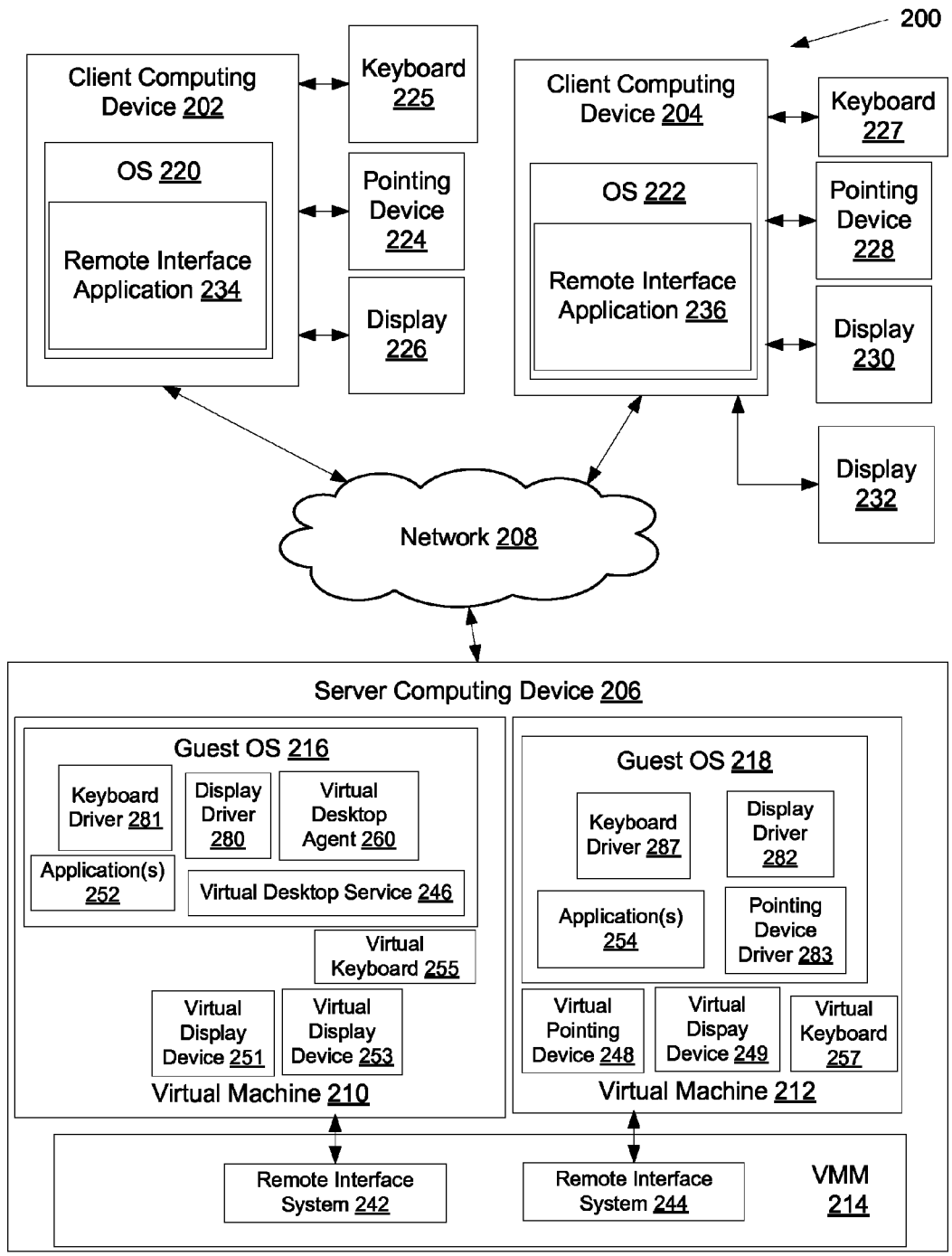
FIG. 2 is a block diagram of a virtualization system, in which embodiments of the present invention may operate.

FIG. 2 is a block diagram of a virtualization system 200, in which embodiments of the present invention may operate. The virtualization system 200 includes, but is not limited to, one or more client computing devices (clients) 202, 204 communicatively coupled to a server computing device (server) 206 over a network 208, which may be a private network or a public network.

Server 206 includes a bare platform hardware that may be a personal computer (PC), server computer, mainframe, or other computing system. The platform hardware can include a processor, memory, input/output devices, etc.

Server 206 includes a virtual machine monitor (VMM) 214 (also known as a hypervisor). The VMM 214, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The VMM 214 presents to the higher level software (commonly referred to as "guest" software) the abstraction of one or more virtual machines (VMs) 210, 212. The VMM 214 may provide the same or different abstractions to various guest software (e.g., guest operating system, guest applications, etc.).

In one embodiment, the VMM 214 is run directly on bare platform hardware. In another embodiment, the VMM 214 is run on top of a host OS (e.g., as a kernel module of a host OS). Alternatively, for example, the VMM 214 may be run within, or on top of, another VMM. VMMs 214 may be implemented, for example, in hardware, software, firmware or by a combination of various techniques.

Server 206 is a host machine that may be enabled to simultaneously run multiple VMs 210, 212, where each VM 210, 212 may be used by a remote client 202, 204. Server 206 allocates a certain amount of the server's resources to each of the VMs 210, 212. Each VM 210, 212 is then able to use the allocated resources to execute applications, including guest operating systems 216, 218. The VMM 214 virtualizes the underlying hardware of the server 206 or emulates hardware devices, making the use of the VMs 210, 212 transparent to the guest operating systems 216, 218 or the remote clients 202, 204 that use the VMs 210, 212.

A virtual machine (VM) 210, 212 is a combination of guest software that uses an underlying emulation of a hardware machine (e.g., as provided by a hypervisor). Each VM 210, 212 may function as a self-contained platform, running its own guest operating system (guest OS 216, 218) and guest software applications (processes) 252, 254. Typically, the virtual machine manager (VMM) 214 manages allocation and virtualization of computer resources and performs context switching, as may be necessary, to cycle between various VMs.

Virtual machines 210, 212 can be, for example, hardware emulation, full virtualization, para-virtualization, and operating system-level virtualization virtual machines. Each virtual machine 210, 212 includes a guest operating system (guest OS) 216, 218 that hosts one or more applications 252, 254 within the virtual machine. The guest OSes 216, 218 running on the virtual machines 210, 212 can be of the same or different types (e.g., two guest OSes may both be Windows operating systems, or one may be a Windows operating system and the other a Linux operating system). Moreover, the guest OSes 216, 218 and the host OS may share the same operating system type, or the host OS may be a different type of OS than one or more guest OSes 216, 218. For example, a guest OS may be a Windows operating system from Microsoft and a host OS may be a Linux operating system available from Red Hat.

Virtual machine 212 includes multiple virtual devices, which may include but are not limited to, a virtual pointing device 248, a virtual keyboard 257 and a virtual display device 249. Virtual pointing device 248 emulates a real pointing device (e.g., pointing device 224), which enables OS 218 to interact with virtual pointing device 248 as though it were a real pointing device. OS 218 may, for example, receive cursor messages from virtual pointing device 248. Virtual display device 249 emulates a physical graphics card (e.g., a PCI, AGP or PCI express display card) that renders data that can be displayed on display device 226. Therefore, virtual display device 249 may receive rendering commands and other graphics information from guest OS 218 and/or applications 254. Virtual keyboard emulates a real keyboard (e.g., keyboard 225).

Guest OS 218 includes a display driver 282 for communicating with and/or controlling the virtual display device 249, a keyboard driver for communicating with and/or controlling the virtual keyboard 257 and a pointing device driver 282 for communicating with and/or controlling virtual pointing device 248. Guest OS 218 may also include additional device drivers for other real and/or virtual devices.

One or more applications 254 run on guest OS 218. These applications may include, for example, a word processing program, computer aided drafting program, computer game, or any other application. The guest OS 218 provides a server desktop (not shown) that may include windows for one or more active applications 154. The server desktop includes a server side cursor.

In one embodiment, the server 206 includes a remote interface system (RIS) 244 for VM 212. The remote interface system 244 may be part of the VMM 214 (as illustrated), part of a hardware emulation layer, or run on top of the VMM 214. Remote interface system 244 connects with a remote interface application 234 (e.g., that resides on client 202) over the network 208, and enables VM 212 to display images on display 226, and client 202 to provide input commands to VM 212.

In one embodiment, a user accesses virtual machine 212 remotely via client 202. Client 202 may be a personal computer (PC), palm-sized computing device, personal digital assistant (PDA), etc. In one embodiment, client 202 is connected with a keyboard 225, a pointing device 224, and a display 226. Display 226 presents graphics data (e.g., image objects) received from a virtual machine 212, as well as graphics data that originates from the client 202. Display 226 can be a display monitor, a window on a monitor screen, or any other entity that can receive graphic input and/or graphic commands.

Client 202 includes an operating system 220 which may be a Windows operating system, a Linux operating system, or some other operating system. Operating system 220 running on client 202 may be the same as, or different from, guest operating system 218. For example, OS 220 may be a Linux OS, and guest OS 218 may be a Windows OS. Operating system 220 includes device drivers (not shown) for interfacing with the attached keyboard 225, pointing device 224 and display 226. Operating system 220 provides a client desktop (not shown) that includes a client side cursor and one or more windows, each of which may be controlled by a local or remote application. The client desktop may be presented to the user via display 226.

Client 202 may be a fat client (client that performs local processing and data storage), a thin client (client that performs minimal or no local processing and minimal to no data storage), and/or a hybrid client (client that performs local processing but little to no data storage). In one embodiment, client 202 essentially acts as input/output device, in which a user can view a desktop environment provided by virtual machine 212 (e.g., a running instance of an operating system including storage available to the operating system and programs installed and/or running on the operating system) on display 226, and interact with the desktop environment via keyboard 225 and pointing device 224.

In one embodiment, OS 220 includes a remote interface application 234 that connects client 202 with VM 212. Remote interface application 234 may negotiate with remote interface system 244 to establish one or multiple connections (channels) with VM 212. In one embodiment, the RIS 244 and remote interface application 234 use a shared connection for the communication of graphics messages, cursor messages and keyboard messages with remote interface application 234. Alternatively, separate connections for different types of data (e.g., a first connection for cursor messages and another connection for graphics messages) may be used. Additionally separate connections for different types of graphics messages may also be used. For example, separate connections may be used for sending video graphics information, cursor graphics information, three-dimensional graphics information, etc. In some embodiments, the RIS 244 and/or remote interface application 234 also perform additional processing (e.g., compression, encryption, streaming, etc.).

The remote interface application 234 may establish connections with multiple virtual devices (e.g., virtual display device 249, virtual keyboard 257 and virtual pointing device 248) included in virtual machine 212. In one embodiment, the remote interface application 234 establishes an initial connection with the server 206 and requests information about available virtual devices (e.g., lists of available virtual devices) from remote interface system 244. The remote interface application 234 can then use this information to establish a display connection, keyboard connection and/or cursor connection with the virtual devices 248, 249, 257 of the VM 212. In one embodiment, the server 206 communicates with remote interface application 234 using a remote access protocol (e.g., Remote Desktop Protocol (RDP), Simple Protocol for Independent Computing Environments (SPICE™) provided by Red Hat, Inc., etc.) that allows for multiple dedicated connections (channels) between VM 212 and client 202.

In one embodiment, remote interface application 234 establishes a cursor connection (cursor channel), a keyboard connection (keyboard channel) and a display connection (display channel). In one embodiment, the cursor connection is established using the client mouse mode. Alternatively, the cursor connection may be established using the server mouse mode.

Remote interface application 234 registers with OS 220 for receiving cursor messages associated with particular local desktop coordinates (e.g., within a window boundary). In client mouse mode, OS 220 receives cursor messages, and updates a cursor position of the client side cursor on the client desktop based on the cursor messages. OS 220 sends the new cursor position coordinates to remote interface application 234 if the updated cursor position corresponds to the coordinates with which the remote interface application 234 is registered. When the cursor position corresponds to the registered coordinates, OS 220 also sends keyboard messages to remote interface application 234.

Remote interface application 234 generates a cursor position message that includes absolute position data from the received cursor position coordinates, and sends the cursor position message to virtual pointing device 248 via the cursor connection. Remote interface application 234 may also send any keyboard messages to the virtual keyboard 257 via the keyboard connection. Virtual pointing device 248 and virtual keyboard 257 forward the cursor position message and keyboard message to pointing device driver 283 and keyboard driver 287, respectively. In one embodiment, virtual pointing device 248 is a virtual absolute pointing device. Therefore, virtual pointing device 248 can interpret the absolute position data included in the cursor position message. Interpreting the received absolute position data may include scaling the data (e.g., if the client desktop has a different resolution from the server desktop). In one embodiment, the virtual pointing device 248 has predefined absolute coordinates, each of which maps to coordinates of the server desktop. Examples of absolute pointing devices include a graphics tablet and a touchscreen.

Guest OS 218 and/or applications 254 respond to the keyboard messages and/or cursor messages, which may cause new graphics commands/information to be generated. For example, new contents may be displayed by an application 254, a new cursor icon may be used, etc. New graphics messages containing the graphics commands/information are sent from display driver 282, to virtual display device 249, and back to remote interface application 234. New cursor graphics information (e.g., for a new cursor icon) may be sent to remote interface application 234 via the display connection or the cursor connection, or via a dedicated cursor graphics connection.

Upon receiving the new graphics messages, remote interface application 234 uses the graphics commands/information included therein to update the client desktop, which is rendered on display 226. If new cursor graphics information is received, remote interface application 234 changes the client side cursor displayed on the client desktop based on the new cursor graphics information. Therefore, the client side cursor may be displayed using the server side cursor's graphics information. In some instances, cursor graphics information generated by applications 254 or guest OS 218 may not be fully supported by OS 220. When cursor graphics information is not fully supported by OS 220, the system transforms the cursor graphics information into a new format that is supported by OS 220. In one embodiment, this transformation is performed by the remote interface application 234. This enables cursor shapes of the guest OS 218 (e.g., a Windows OS) to be displayed on OS 220 (e.g., a Linux OS) without any special drivers or files installed on either OS 218 or OS 220 for displaying the cursor shapes. Embodiments of cursor graphics rendering is discussed in greater detail below with reference to FIGS. 8-10.

Virtual machine 210 includes multiple virtual devices, which may include but are not limited to, a virtual desktop service 246, a virtual keyboard 255 and multiple virtual display devices 251, 253. Virtual machine further includes a Guest OS 216, which includes a display driver 280, a keyboard driver 281, a virtual desktop agent 260 and one or more applications 252. Guest OS 216 may also include additional device drivers for other real and/or virtual devices. The guest OS 216 provides a server desktop (not shown) that may include windows for one or more active applications 154. The server desktop includes a server side cursor.

In one embodiment, the server 206 includes a remote interface system (RIS) 242 for VM 210. Remote interface system 242 connects with a remote interface application 236 (that resides on client 204) over the network 208, and enables VM 210 to display images on displays 230, 232, and client 204 to provide input commands to VM 210.

In one embodiment, a user accesses virtual machine 210 remotely via client 204. Client 204 may be a personal computer (PC), palm-sized computing device, personal digital assistant (PDA), etc. In one embodiment, client 204 is connected with a keyboard 227, a pointing device 228, and multiple displays 230, 232. Each of the displays 230, 232 can be a display monitor, a window on a monitor screen, or any other entity that can receive graphic input and/or graphic commands.

Client 204 includes an operating system 222, which includes device drivers (not shown) for interfacing with the attached keyboard 227, pointing device 228 and displays 230, 232. Operating system 222 provides a client desktop (not shown) that includes a client side cursor and one or more windows, each of which may be controlled by a local or remote application. The client desktop may be presented to the user via one or both of displays 230, 232.

In one embodiment, OS 222 includes a remote interface application 236 that connects client 204 with VM 210. Remote interface application 236 may negotiate with remote interface system 242 to establish one or multiple connections (channels) with VM 210. The remote interface application 236 may establish connections with multiple virtual devices included in virtual machine 212. In one embodiment, the server 206 communicates with remote interface application 236 using a remote access protocol (e.g., Remote Desktop Protocol (RDP), Simple Protocol for Independent Computing Environments (SPICE™) provided by Red Hat, Inc., etc.) that allows for multiple dedicated connections (channels) between VM 210 and client 204.

In one embodiment, remote interface application 236 establishes a cursor connection (cursor channel) with virtual desktop service 246, a keyboard connection (keyboard channel) with virtual keyboard 255 and a separate display connection (display channel) with each virtual display device 251, 253. In one embodiment, the cursor connection is established using the client mouse mode. Alternatively, the cursor connection may be established using the server mouse mode.

Remote interface application 236 registers with OS 222 for receiving cursor messages associated with particular local desktop coordinates (e.g., within a window boundary). In client mouse mode, OS 222 receives cursor messages, and updates a cursor position of the client side cursor on the client desktop based on the cursor messages. OS 222 sends the new cursor position coordinates (which are in a client desktop reference frame) to remote interface application 234 if the cursor position corresponds to the coordinates with which the remote interface application 236 is registered. When the cursor position corresponds to the registered coordinates, OS 220 also sends keyboard messages to remote interface application 236.

Remote interface application 236 sends a cursor position message that includes absolute position data to virtual desktop agent 260. In one embodiment, remote interface application 236 sends the cursor position message to virtual desktop agent 260 via the cursor connection. If display 230 and display 232 correspond to separate monitors, the sent cursor position message may identify desktop coordinates and an associated display identification (ID), indicating that the cursor position is at a particular position on one of the two displays 230, 232. Remote interface application 236 may also send any keyboard messages to the virtual keyboard 255 via the keyboard connection, which may be forwarded on to keyboard driver 281.

Virtual desktop agent 260 emulates a pointing device that uses absolute position data. However, unlike virtual pointing device 248, virtual desktop agent 260 does not have a fixed mapping between coordinate value inputs (from the client desktop reference frame) and coordinate value outputs (of the server desktop reference frame). Virtual desktop service 246 maintains a connection with a virtual desktop agent 260, both running inside guest OS 216. In one embodiment, the virtual desktop service 246 uses a virtual desktop interface (VDI) port device driver that communicates with a virtual desktop interface port device included in the virtual machine 210.

Virtual desktop agent (VD agent) 260 translates the absolute position coordinates included in the cursor movement message (having a client desktop reference frame) into a server desktop reference frame. To accurately translate the position coordinates from the client desktop reference frame to the server desktop reference frame, in one embodiment, virtual desktop agent 260 queries the guest OS 216 to determine current display settings for the guest OS 216. The current display settings may include, for example, identification of each virtual display device 251, 253 that the OS 216 is using, as well as resolution settings and relative positions of each of the virtual display devices 251, 253.

In one embodiment, the display settings are automatically set (e.g., by VD agent 260) according to current display settings of client 204. The display settings may automatically be set, for example, when the client 204 establishes a connection with VM 210. VD agent 260 computes a total desktop area for the server desktop based on the current display settings. The VD agent 260 may divide the total server desktop area into separate regions, and assign each of the virtual display devices 251, 253 one of the separate regions. VD agent 260 can then use the total desktop area to translate the received absolute position data from the client desktop area to the server desktop area. VD agent 260 uses the translated absolute position data to update a cursor position of the server side cursor on the server desktop.

Guest OS 216 and/or applications 252 respond to the keyboard messages and/or cursor messages, which may cause new graphics commands/information to be generated. New graphics messages including the graphics commands/information are sent from display driver 280, to one or both of virtual display devices 251, 253, and back to remote interface application 236. If the cursor position corresponds to a region of the total desktop area assigned to virtual display device 251, the new graphics commands/information may be sent to virtual display device 251. If the cursor position corresponds to a region of the total desktop area assigned to virtual display device 253, the new graphics commands/information may be sent to virtual display device 253. The new graphics commands/information may then be transmitted to remote interface application 236 via an appropriate connection (e.g., via a first display connection associated with virtual display device 251 or a second display connection associated with virtual display device 253).

Upon receiving the new graphics messages, remote interface application 236 uses the graphics commands/information included therein to update display 230 and/or display 232. In one embodiment, remote interface application 236 includes a client display manager (not shown) that receives graphics commands/information, and determines which display 230, 232 should present this data. In one embodiment, in which the data is received via a dedicated channel (e.g., a socket), the client display manager makes this determination based on the context of the dedicated channel (e.g., using a mapping between the channel ID and the display ID). In another embodiment, in which the data is received via a shared connection (e.g., using a virtual channel with a channel ID), the client display manager makes this determination based on the identifier of the display device that is included in the received data (e.g., in a header of a graphics command issued by the virtual display device).

If new cursor graphics information is received, remote interface application 236 changes the client side cursor displayed on the client desktop based on the new cursor graphics information. In some instances, cursor graphics information generated by applications 252 or guest OS 216 may not be fully supported by OS 222. When cursor graphics information is not fully supported by OS 222, the system transforms the cursor graphics information into a new format that is supported by OS 222. Embodiments of cursor graphics rendering are discussed in greater detail below with reference to FIGS. 8-10.

Note that though the above discussion has described client 202 as being connected with VM 212, client 202 may also connect to VM 210. Similarly, client 204 may connect to VM 212. If client 204 connected to VM 212, in client mouse mode only one display (e.g., display 230 or display 232) may be used.

Though virtualization system 200 was discussed primarily with reference to a client mouse mode, it should be understood that in alternative embodiments the system 200 may also implement the server mouse mode. In yet other embodiments, the virtualization system 200 dynamically switches between the server mouse mode and the client mouse mode. Such dynamic switching may be initiated by the remote interface systems 242, 244 or by the remote interface applications 234, 236. Some embodiments of dynamic switching of mouse modes are discussed in greater detail below with reference to FIG. 11.

Figure 3:
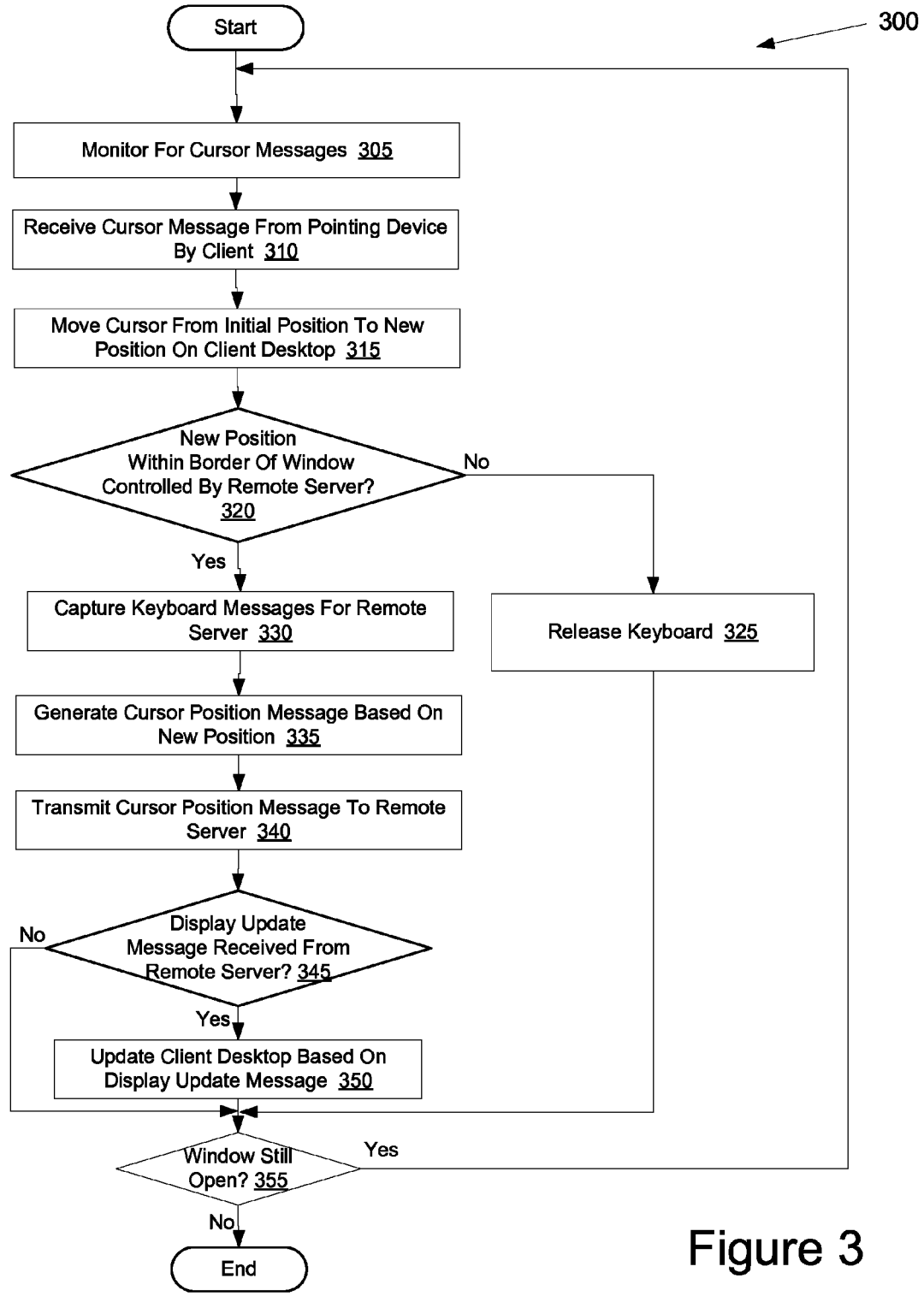
FIG. 3 is a flow diagram illustrating a client-side method for supporting a client mouse mode, in accordance with one embodiment of the invention.

FIG. 3 is a flow diagram illustrating a client-side method 300 for supporting a client mouse mode, in accordance with one embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by client computing device 202 or client computing device 204 of FIG. 2. In another embodiment, method 300 may be performed by client computing device 105 of FIG. 1A.

The client computing device (client) maintains a client desktop that includes a client side cursor and one or more windows, which may be controlled by local applications or remote applications (e.g., applications running on a remote server). The client may have established a dedicated cursor connection to a server (e.g., to a virtual machine hosted by a server). The dedicated cursor connection may be between a remote interface application of the client and a virtual pointer device or virtual desktop agent running on the guest OS.

Referring to FIG. 3, at block 305 the client monitors for cursor messages. The client may also monitor for keyboard messages. At block 310, the client receives a cursor message from a pointing device. The cursor message may include absolute position data (e.g., as generated by a tablet device) or delta position data (e.g., as generated by a mouse). At block 315, the client moves the client side cursor on the client desktop from an initial position to a new position.

At block 320, the client determines whether the new position of the client side cursor is within a border of a window controlled by the remote server. The window may be controlled by and/or associated with an application or operating system running on the remote server (or on a virtual machine hosted by the remote server). The application or operating system may control the window via a remote interface application that runs on the client. If the new position is within the border of the window controlled by the remote server, the method continues to block 330. Otherwise, the method continues to block 325.

At block 330, the client captures keyboard messages for the remote server. This enables keyboard messages that are received by the client to be forwarded on to the remote server. Note that the keyboard messages are captured automatically, without any need for a user to manually request a keyboard or cursor command capture.

At block 325, the client releases the keyboard so that keyboard messages are no longer sent to the remote server. The keyboard may be released automatically when the cursor position is outside of the borders of the window controlled by the remote server. This can be performed without any need for a user to manually request that the keyboard be released.

At block 335, the client generates a cursor position message based on the new position of the client side cursor. The cursor position message includes absolute position data in the form of coordinates in the desktop reference frame. At block 340, the client transmits the cursor position message to the remote server. In one embodiment, the cursor position message is sent to the server via a dedicated cursor connection (channel). In a further embodiment, the cursor position message is sent directly to a virtual pointing device or other desktop agent that runs within a virtual machine hosted by the server.

At block 345, the client determines whether a display update message has been received from the server. The display update message is a graphics message that may include graphics commands/information for updating the displayed contents of the window controlled by the server. In one embodiment, display update messages are received via one or more dedicated display connections. If the display update message includes cursor graphics information, the cursor graphics information may be sent via the cursor connection. If a display update message is received, the method continues to block 350. Otherwise, the method proceeds to block 355.

At block 350, the client desktop is updated based on the display update message. More specifically, the window controlled by the server is updated based on the display update message.

At block 355, the client determines whether any window controlled by the server is still open. If a window controlled by the server is open, the method returns to block 305. If there are no windows controlled by the server, the method ends.

Figure 4:
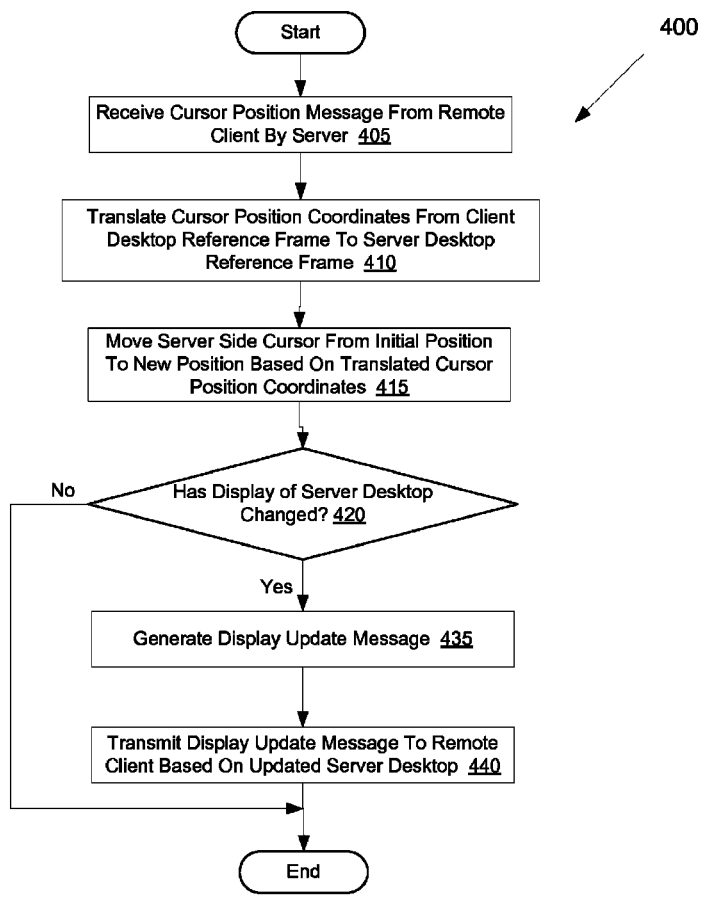
FIG. 4 is a flow diagram illustrating a server-side method for supporting a client mouse mode, in accordance with one embodiment of the invention.

FIG. 4 is a flow diagram illustrating a server-side method 400 for supporting a client mouse mode, in accordance with one embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by server computing device 206 of FIG. 2. In another embodiment, method 400 may be performed by server computing device 110 of FIG. 1A.

Referring to FIG. 4, at block 405 the server receives a cursor position message from a remote client. The cursor position message includes absolute position data (cursor position coordinates) of a client side cursor in the reference frame of a client desktop. The cursor position message may be received from the client via a dedicated cursor connection.

At block 410, the server translates the cursor position coordinates from the client desktop reference frame to a server desktop reference frame. If the client desktop has the same resolution as the server desktop, then no translation may be necessary.

At block 415, the server moves a server side cursor from an initial position to a new position on the server desktop using the translated cursor position coordinates. At block 420, the server determines whether a display of the server desktop has changed. A change in the display of the server desktop may include opening of new windows, closing of windows, updated video data, a new cursor shape for a server side cursor, etc. In one embodiment, a new position of the server side cursor, in which the cursor shape has not changed, is not considered a change in the display of the server desktop. If the display of the server desktop has changed, the method continues to block 435. If the display of the server desktop has not changed, the method ends.

At block 435, the server generates a display update message. The display update message may include new graphics commands and/or information (e.g. rendering commands) that the client can use to update the client desktop. In one embodiment, multiple display update messages are generated. For example, if the client or server includes multiple displays, a separate display update message may be generated for each display. Additionally, separate display update messages may be generated for different types of graphics information. For example, separate display update messages may be generated for cursor graphics information and for non-cursor graphics information.

At block 440, the server transmits the display update message or messages to the client. The display update message or messages may be transmitted to the client via one or more dedicated display connections. Display update messages that include only cursor graphics information may be sent to the client via a dedicated cursor connection. The client may use the received display update messages to update a display of the client desktop. The method then ends.

Figure 5:
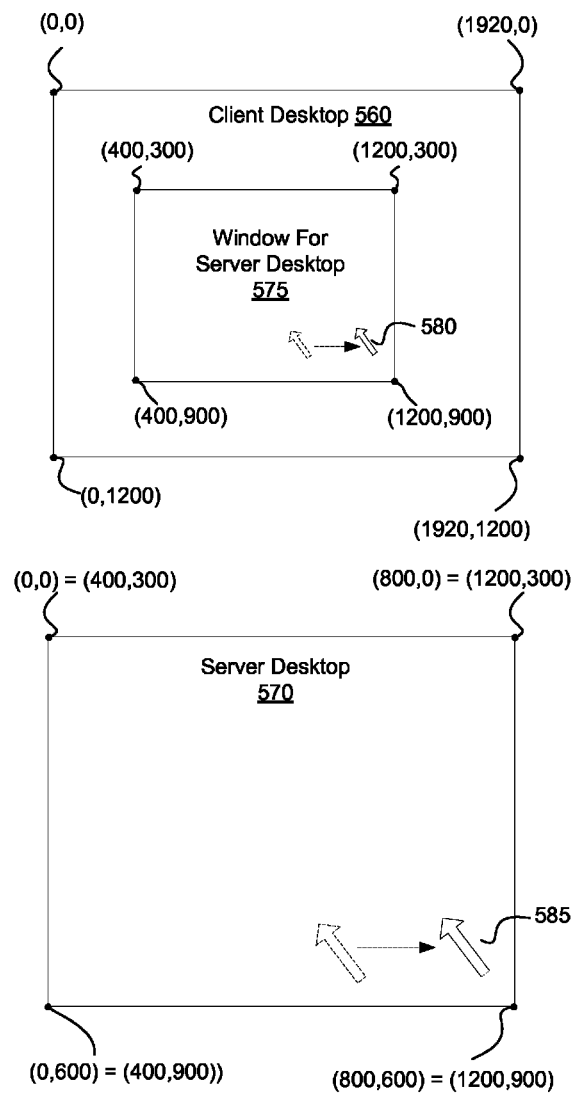
FIG. 5 illustrates a comparison of a client desktop and a server desktop, in accordance with one embodiment of the present invention.

FIG. 5 illustrates a comparison of a client desktop 560 and a server desktop 570, in accordance with one embodiment of the present invention. The client desktop 560 and server desktop 570 may correspond to the client desktops and server desktops discussed above with reference to FIGS. 1A-4. As shown, the client desktop 560 includes a window 575 for the server desktop. As a position of a client side cursor 580 in the client desktop 560 is changed, if the client side cursor 580 is within boundaries of the window 575, then a server side cursor 585 in the server desktop 570 is also changed. If the client side cursor 580 is moved outside of the boundaries of the window 575, then the server side cursor 585 may not be changed.

In one embodiment, the server desktop 570 has a different resolution than the client desktop 560. In the illustrated example, the client desktop 560 has a resolution of 1920×

1200 pixels, while the server desktop 570 has a resolution of 800×600 pixels. The location of the window 575 may also not be fixed within the client desktop 560. In the illustrated example, the window 575 has an upper left hand corner positioned at coordinates (400,300) on the client desktop. When the position of the client side cursor 580 is changed, this change is based on a reference frame of the client desktop 560. To accurately update the position of the server side mouse 585 on the server desktop 570 based on the changed position of the client side cursor 580, the position may be transformed to the reference frame of the server desktop 570. This may be performed using a known relationship between the client desktop 560 and the server desktop 570. For example, the cursor position (400,300) on the client desktop 560 may be transformed to cursor position (0,0) on the server desktop 570, the position (1200, 300) on the client desktop 560 may be transformed to position (800,0) on the server desktop 570, etc.

Figure 6:
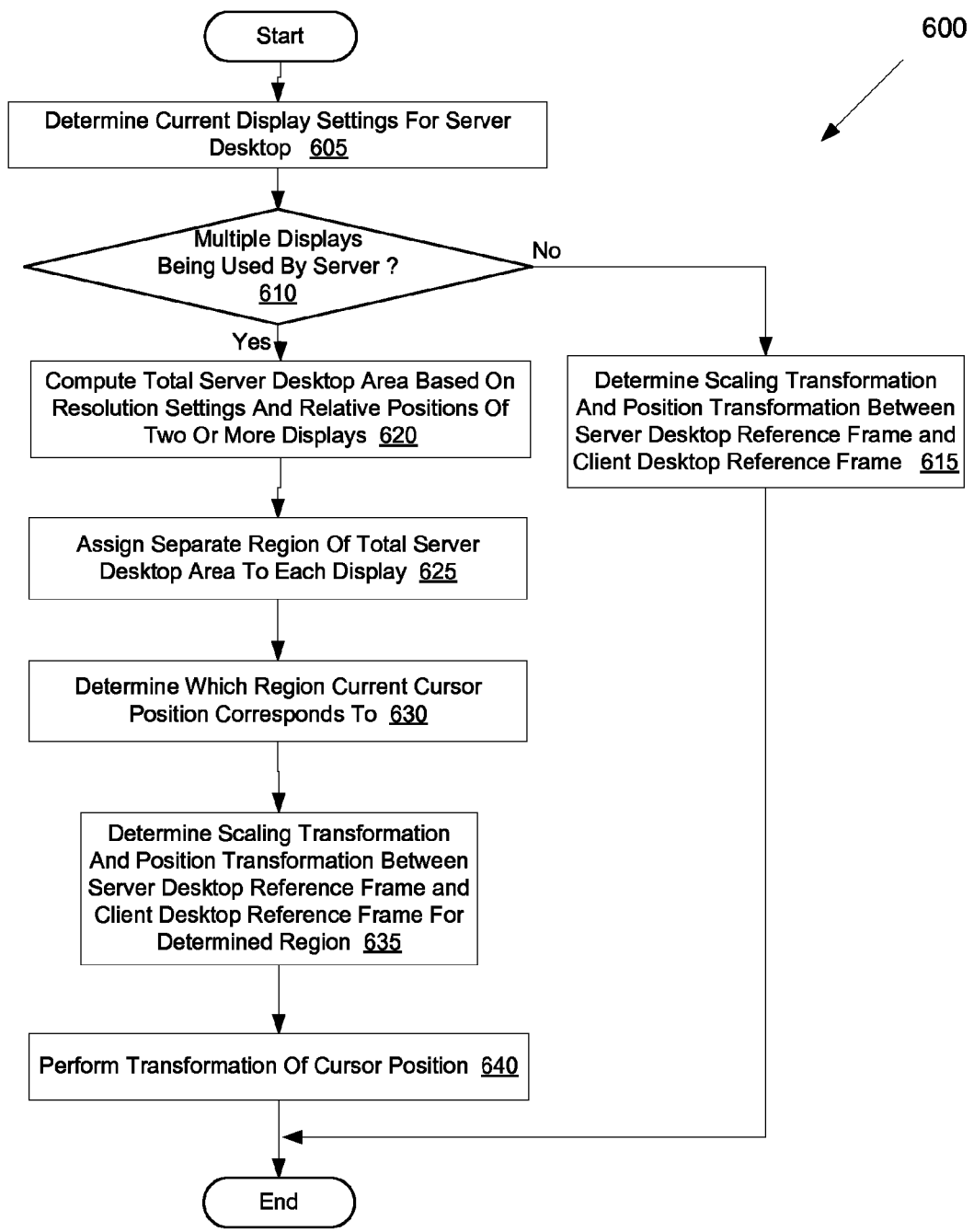
FIG. 6 is a flow diagram illustrating a method for translating cursor position messages from a client desktop reference frame to a server desktop reference frame, in accordance with one embodiment of the invention.

FIG. 6 is a flow diagram illustrating a method 600 for translating cursor position messages from a client desktop reference frame to a server desktop reference frame, in accordance with one embodiment of the invention. Method 600 may be performed by processing logic that may comprise hardware (e.g., circuitry, dedicated logic, programmable logic, microcode, etc.), software (such as instructions run on a processing device), or a combination thereof. In one embodiment, method 600 is performed by server computing device 110 of FIG. 1A. In various embodiments, method 600 is performed by the virtual desktop agent 260, virtual pointing device 248 and pointing device driver 283 of FIG. 2. In one embodiment, method 600 corresponds to block 410 of method 400.

Referring to FIG. 6, at block 605 the server determines current display settings for a server desktop managed by the server. In one embodiment, the current display settings of the server desktop match current display settings for the client desktop. In one embodiment, the server hosts a VM that includes a guest OS. The current display settings and the server desktop may be managed by the guest OS. The display settings may include a number of displays on which the server desktop is displayed. Each of the displays may correspond to a monitor, a window displayed on a monitor, or any other entity that can receive graphic input and/or graphic commands. In one embodiment, each of the displays corresponds to a virtual display device with which the guest OS is connected.

At block 610, the server determines whether multiple displays are being used. If multiple displays are being used, the method continues to block 620. If only a single display is being used, the method continues to block 615.

At block 615, the server determines a scaling transformation and a position transformation between a server desktop reference frame and a client desktop reference frame. Such a transformation is illustrated in FIG. 5. If the resolution of the server desktop corresponds to the resolution of the client desktop, then no transformation may be necessary. This may be the case, for example, if the server desktop is shown in a full screen mode on a client display.

At block 620, the server computes a total server desktop area based on the resolution settings and relative positions of the two or more displays used by the server. At block 625, the server assigns a separate region of the total server desktop area to each display. At block 630, the server determines which region the current cursor position corresponds to. At block 635, the server determines a scaling transformation and a position transformation between the server desktop reference frame and the client desktop reference frame for the determined region. At block 640, the server then performs the transformation of the cursor position from the client desktop reference frame to the server desktop reference frame.

Figure 7A:
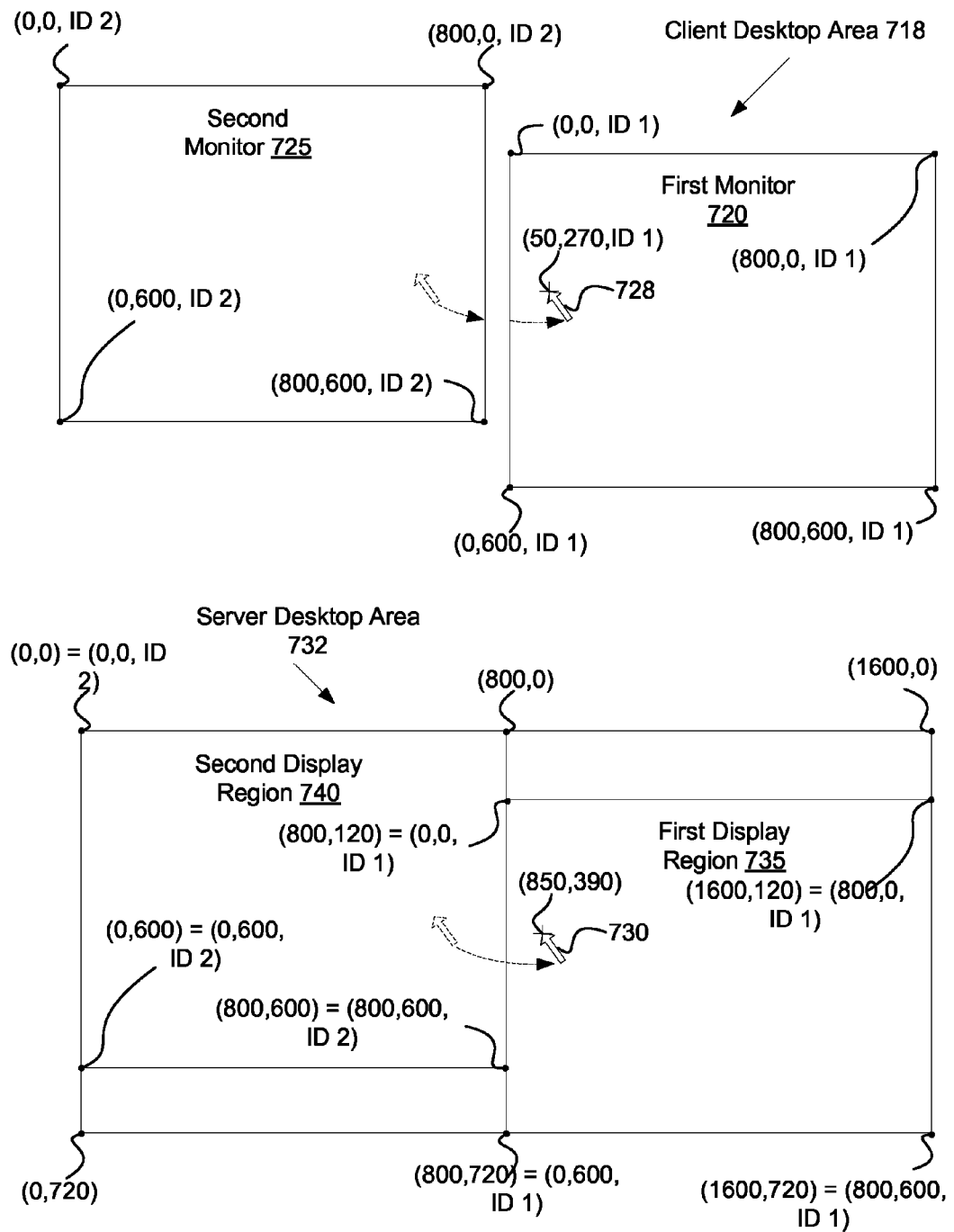
FIG. 7A illustrates a comparison of a client desktop area and a server desktop area, in accordance with one embodiment of the present invention.
Figure 7B:
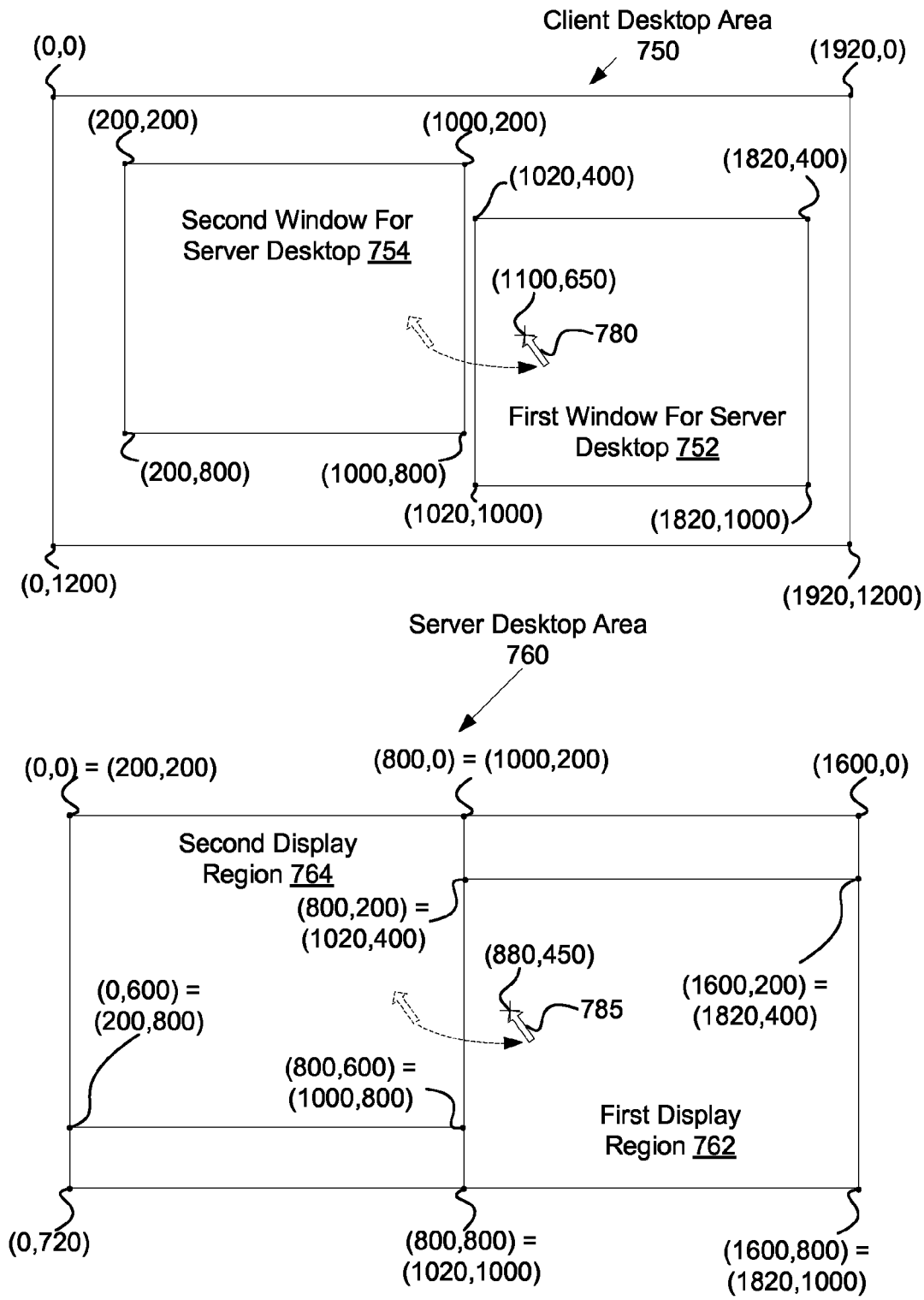
FIG. 7B illustrates a comparison of a client desktop area and a server desktop area, in accordance with another embodiment of the present invention.

FIGS. 7A and 7B illustrate two examples of transformations between the client desktop reference frame and the server desktop reference frame, in accordance with embodiments of the present invention. FIG. 7A illustrates a comparison of a client desktop area 718 and a server desktop area 732, in accordance with one embodiment of the present invention. The client desktop area 718 and server desktop area 732 may correspond to any of the client desktops and server desktops discussed above with reference to FIGS. 1A-4 and 6. For example, the client desktop area 718 may be managed by an operating system running on a client machine, and the server desktop area 732 may be managed by an operating system running on a server machine. Additionally, the server desktop area 732 may be managed by a guest OS that runs on a virtual machine (which may include multiple virtual display devices) hosted by the server.

As shown, the client desktop area 718 includes an arrangement of a first monitor 720 and a second monitor 725, on which a client desktop is displayed. Server desktop area 732 includes a total desktop area that has been divided into a first display region 735 and a second display region 740. The first display region 735 may be associated with a first virtual display device included in a virtual machine hosted by the server, and the second display region 740 may be associated with a second virtual display device included in the virtual machine. In one embodiment, a full screen mode is used, in which the first monitor 720 displays the first display region 735 and the second monitor 725 displays the second display region 740.

As a position of a client side cursor 728 in the client desktop area 718 is changed (e.g., from an area of the client desktop area 718 presented by second monitor 725 to an area of the client desktop area 718 presented by first monitor 720), a server side cursor 585 in the server desktop area 732 is also changed. When the position of the client side cursor 728 is changed, this change is determined in a reference frame of the client desktop. To accurately update the position of the server side cursor 730 on the server desktop based on the changed position of the client side cursor 728, the position may be transformed to the reference frame of the server desktop. This may be performed using a known relationship between the client desktop area 718 and the server desktop area 732.

The cursor position that is recorded in the client desktop reference frame may include a monitor identification (ID) of the monitor (e.g., first monitor 720 or second monitor 725) on which the cursor is located, and an x-y position of the cursor position on that monitor. For example, client side cursor 728 is shown to have a position of (50,270,ID 1) in the client desktop reference frame.

The total server desktop area 732 can be determined based on the resolutions and relative positions of each of the displays used by the server. In the illustrated example, a first display is located to a right of a second display, with a vertical offset that is equivalent to 120 pixels. Moreover, both the first display and second display have resolutions of 800×600. Therefore, a total server desktop area is determined to be 1600 pixels along the horizontal direction and 720 pixels along the vertical direction. The first display is assigned first display region 735, having coordinates (820,120) through (1600,720). The second display is assigned second display region 740, having coordinates (0,0) through (800,600). The cursor position for the client side cursor 728 having the client desktop coordinates of (50,270, ID 1) can be converted to the coordinates (850,390) in the server side reference frame, and used to update the position of the server side cursor 730 on the server desktop.

FIG. 7B illustrates a comparison of a client desktop area 750 and a server desktop area 760, in accordance with another embodiment of the present invention. The client desktop area 750 and server desktop area 760 may correspond to any of the client desktops and server desktops discussed above with reference to FIGS. 1A-4 and 6. For example, the client desktop area 750 may be managed by an operating system running on a client machine, and the server desktop area 760 may be managed by an operating system running on a server machine. Additionally, the server desktop area 760 may be managed by a guest OS that runs on a virtual machine (which may include multiple virtual display devices) hosted by the server.

As shown, the client desktop area 750 includes single monitor having a first window 752 controlled by server and a second window 754 also controlled by server. The monitor has a resolution setting of 1920×1200 pixels in the illustrated example. Server desktop area 760 includes a total desktop area that has been divided into a first display region 762 and a second display region 764. The first display region 762 may be associated with a first virtual display device included in a virtual machine hosted by the server, and the second display region 764 may be associated with a second virtual display device included in the virtual machine. In one embodiment, first window 752 displays the first display region 762 and the second window 754 displays the second display region 764.

As a position of a client side cursor 780 in the client desktop area 750 is changed, if the client side cursor 780 is within boundaries of one of the windows 752, 754, then a server side cursor 785 in the server desktop 760 is also changed. If the client side cursor 780 is moved outside of the boundaries of the windows 752, 754, then the server side cursor 785 may not be changed. When the position of the client side cursor 780 is changed, this change is based on a reference frame of the client desktop. To accurately update the position of the server side cursor 785 on the server desktop based on the changed position of the client side cursor 780, the position may be transformed to the reference frame of the server desktop. This may be performed using a known relationship between the client desktop area 750 and the server desktop area 760.

To identify a relationship between the client desktop reference frame and the server desktop reference frame, a total server desktop area 760 is determined based on the resolutions and relative positions of each of the displays used by the server. In the illustrated example, a first display is located to a right of a second display, with a vertical offset that is equivalent to 120 pixels. Moreover, both the first display and second display have resolutions of 800×600. Therefore, a total server desktop area is determined to be 1600 pixels along the horizontal direction and 720 pixels along the vertical direction. The first display is assigned first display region 762, having coordinates (820,200) through (1600,800). The second display is assigned second display region 764, having coordinates (0,0) through (800,600). The cursor position for the client side cursor 780 having the client desktop coordinates of (1100, 650) can be converted to the coordinates (880,450) in the server side reference frame, and used to update the position of the server side cursor 785 on the server desktop.

Figure 8:
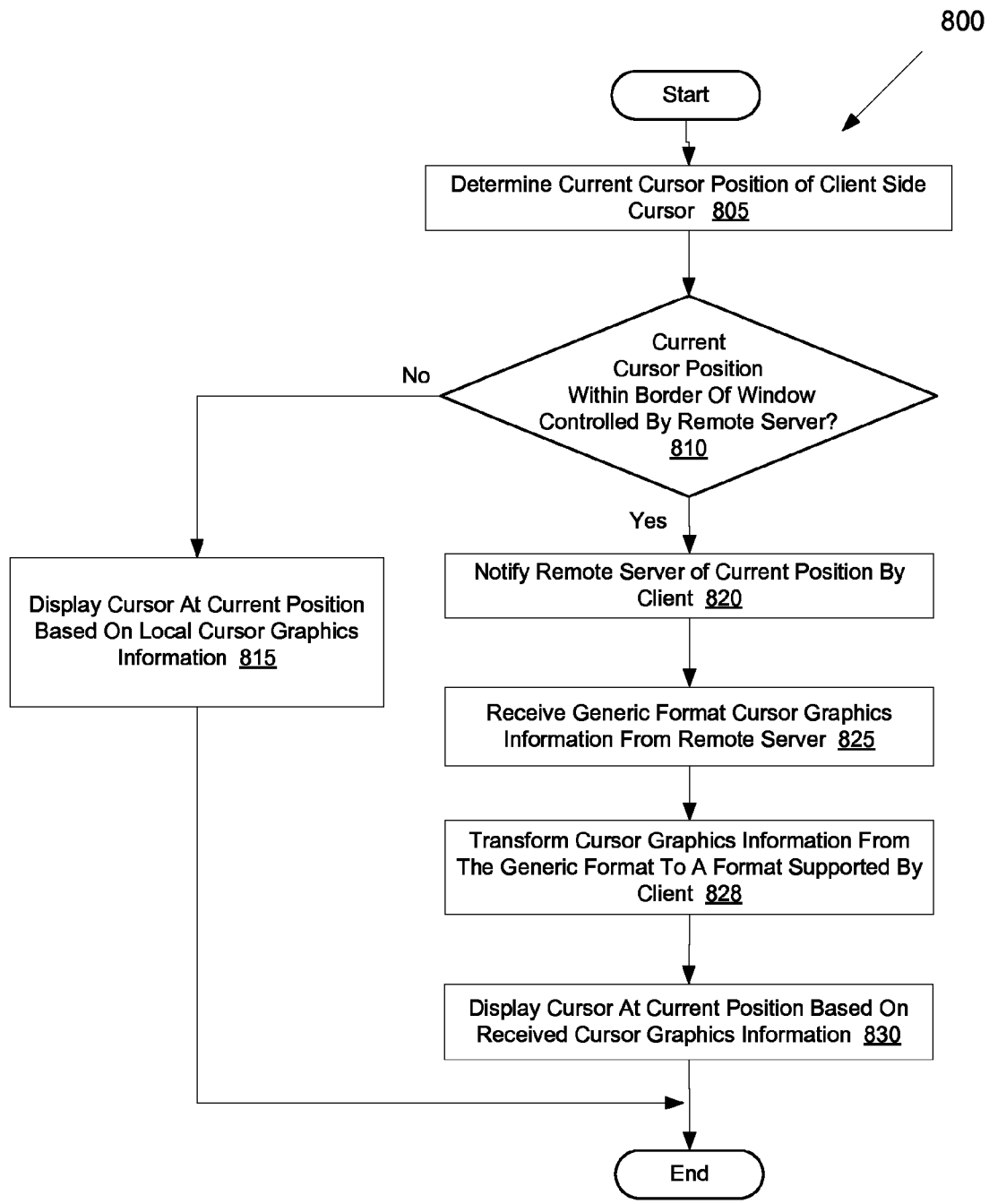
FIG. 8 is a flow diagram illustrating a client-side method for rendering cursor graphics, in accordance with one embodiment of the invention.

FIG. 8 is a flow diagram illustrating a client-side method 800 for rendering cursor graphics, in accordance with one embodiment of the invention. Method 800 may be performed by processing logic that may comprise hardware (e.g., circuitry, dedicated logic, programmable logic, microcode, etc.), software (such as instructions run on a processing device), or a combination thereof. In one embodiment, method 800 is performed by client computing device 202 or client computing device 204 of FIG. 2. In another embodiment, method 800 may be performed by client computing device 105 of FIG. 1A.

The client computing device (client) maintains a client desktop that includes a client side cursor and one or more windows, which may be controlled by local applications or remote applications (e.g., applications running on a remote server). The client may have established a dedicated cursor connection to a server (e.g., to a virtual machine hosted by a server) and/or one or more dedicated display connections to the server. The dedicated cursor connection may be between a remote interface application of the client and a virtual interface device running on the virtual machine. The dedicated display connections may be between a remote interface application of the client and virtual display devices running on the virtual machine.

Referring to FIG. 8, at block 805 the client determines a current cursor position of a client side cursor. At block 810 the client determines whether the position of the client side cursor is within a border of a window controlled by the remote server. The window may be controlled by an application or operating system running on the remote server, or on a virtual machine hosted by the remote server. The application or operating system may control the window via a remote interface application that runs on the client. If the new position is within the border of the window controlled by the remote server, the method continues to block 820. Otherwise, the method continues to block 815.

At block 815, the client displays the client side cursor at the current position based on local graphics information (e.g., a cursor shape, bitmap, mask, color palette, etc. included in the OS of the client).

At block 820, the client notifies the server of the current position (e.g., by generating a cursor position message or a cursor movement message based on the position of the client side cursor, and sending the cursor message to the server). In one embodiment, a cursor message is sent to the server via a dedicated cursor connection (channel).

At block 825, the client receives cursor graphics information from the remote server. In one embodiment, the cursor graphics information is received via the cursor connection. Alternatively, the cursor graphics information may be received via a display connection. The received cursor graphics information may include a cursor shape, a bitmap, a mask, a color palette, etc.

The received cursor graphics information may be received in a generic format. Alternatively, the cursor graphics information may be received in an original non-generic format associated with an operating system running on the remote server. At block 828, the client transforms the cursor graphics information to a format supported by the client's OS. In one embodiment, the client includes one or more transformation rules that control how to transform the cursor graphics information from the generic format (or original format) to the format supported by the client's OS.

One example of cursor transformation is transforming from a cursor graphics information format supported by a Windows operating system to a cursor graphics information format supported by a Linux operating system. Windows operating systems include support for alpha masks (which cause the cursor to have colors that are a combination of the cursor color and a background color), while Linux operating systems do not. An alpha mask may have an alpha value that designates how strongly to weight the cursor color and how strongly to weight the background color in determining a color to use for the final display of the cursor. In one embodiment, the cursor graphics information is modified by replacing the alpha mask with a part transparent, part opaque pixel matrix. The number of transparent pixels vs. the number of opaque pixels may be controlled by the alpha value included in the alpha mask. For example, in one embodiment, the pixel matrix is half transparent and half opaque.

At block 830, the client side cursor is displayed at the current position using the received cursor graphics information. Therefore, the client side cursor may be displayed using cursor graphics of a remote OS that may be different from the client's OS. For example, a client side cursor of a Linux OS may have a shape and other properties of a Windows OS cursor.

Figure 9:
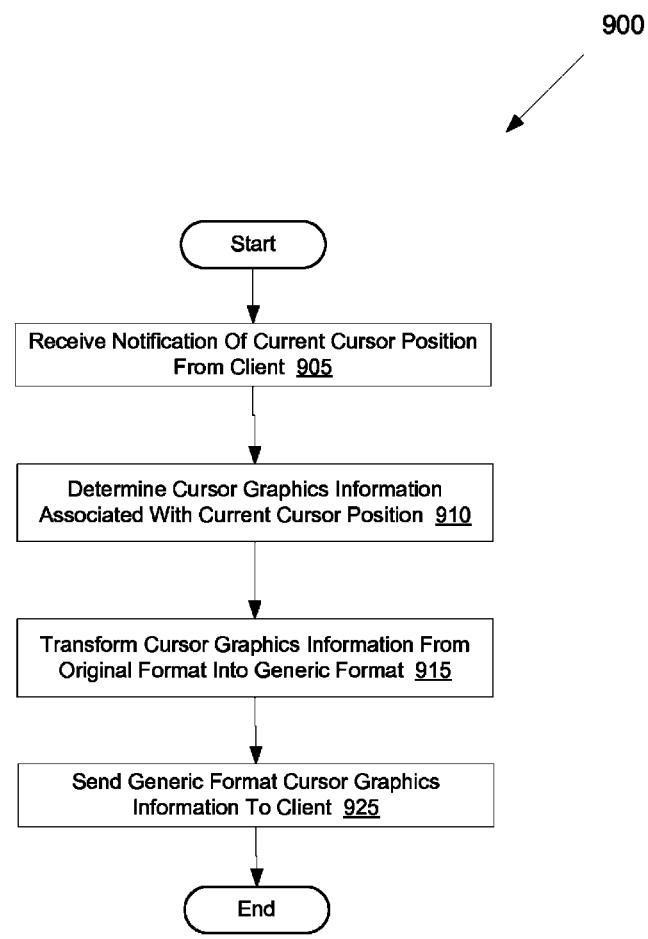
FIG. 9 is a flow diagram illustrating a server-side method for rendering cursor graphics, in accordance with one embodiment of the invention.

FIG. 9 is a flow diagram illustrating a server-side method 900 for rendering cursor graphics, in accordance with one embodiment of the invention. Method 900 may be performed by processing logic that may comprise hardware (e.g., circuitry, dedicated logic, programmable logic, microcode, etc.), software (such as instructions run on a processing device), or a combination thereof. In one embodiment, method 900 is performed by server computing device 206 of FIG. 2. In another embodiment, method 900 is performed by server computing device 110 of FIG. 1A.

A client computing device (client) maintains a client desktop that includes a client side cursor and one or more windows, one or more of which may be controlled by the server (or an application running on server). The client may have established a dedicated cursor connection to the server (e.g., to a virtual machine hosted by server) and/or one or more dedicated display connections to the server. The dedicated cursor connection may be between a remote interface application of the client and a virtual interface device running on the virtual machine. The dedicated display connections may be between a remote interface application of the client and virtual display devices running on the virtual machine.

Referring to FIG. 9, at block 905 the server receives a notification from the client of a current cursor position. In one embodiment, the virtual machine hosted by the server includes a guest OS. The guest OS may have a server desktop, which may include a server side cursor. Depending on an active application and/or where the server side cursor is positioned on the server desktop, different cursor graphics information may be used to display the server side cursor. At block 910, the server determines cursor graphics information associated with the current position (e.g., based on an active application, current position of the server side cursor, etc.). The cursor graphics information may be formatted in an original format that is native to the guest OS.

At block 915, the server transforms the cursor graphics information from the original format to a generic format. The generic format may be supported by multiple different operating systems (e.g., by OS X, Windows and Linux OSes). Alternatively, the server may not perform any format transformation on the cursor graphics information (e.g., if the original format is a generic format).

At block 925, the cursor graphics information (e.g., generic format cursor graphics information) is sent to the client. The method then ends.

Figure 10:
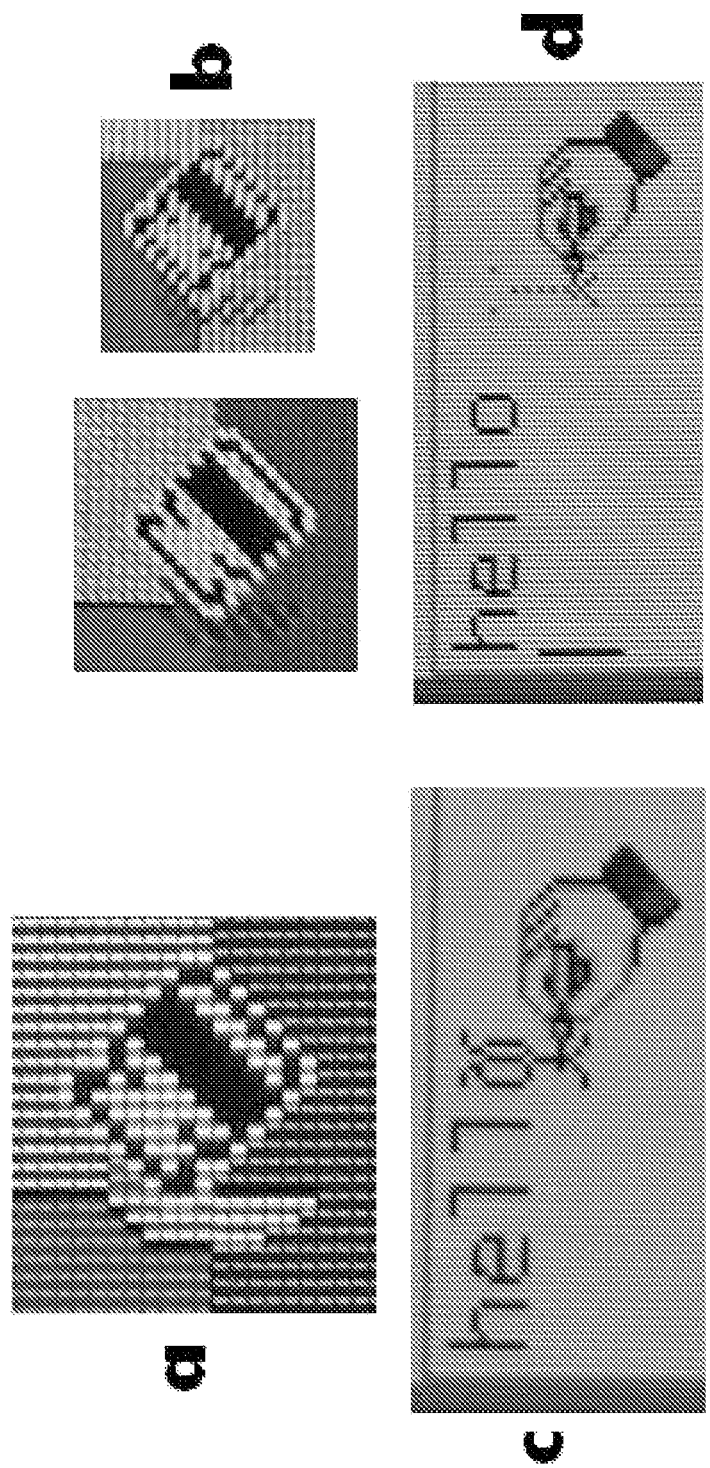
FIG. 10 illustrates a comparison between cursor graphics information that includes an alpha mask and cursor graphics information that includes a half transparent, half opaque pixel matrix, in accordance with one embodiment of the present invention.

FIG. 10 illustrates a comparison between cursor graphics information that includes an alpha mask and cursor graphics information that includes a half transparent, half opaque pixel matrix, in accordance with one embodiment of the present invention. In FIG. 10, illustrations A and C show cursors that are displayed using an alpha mask (e.g. Windows client), while illustrations B and D show the transformed cursors that are displayed using a half transparent, half opaque pixel matrix (e.g. Linux client).

Figure 11:
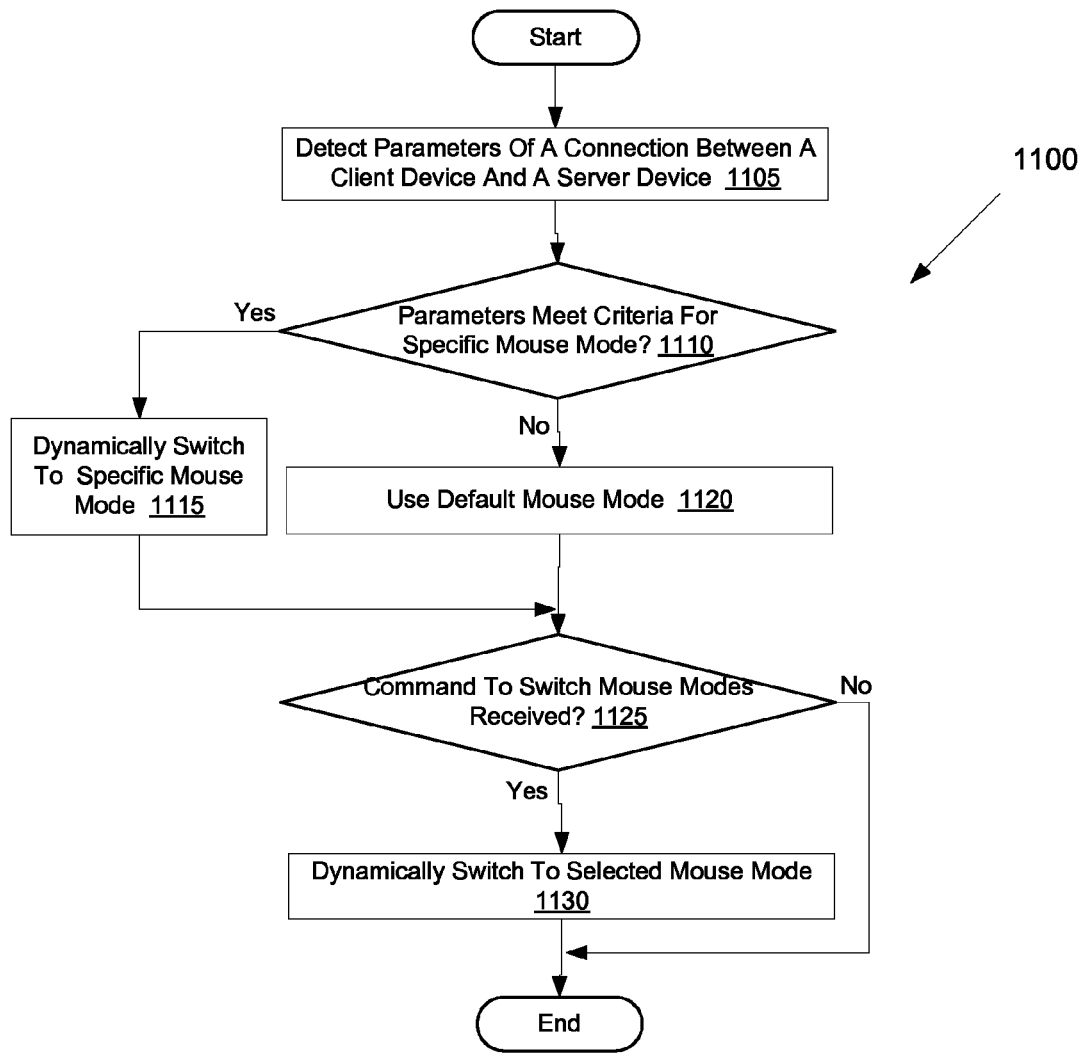
FIG. 11 is a flow diagram illustrating a method for dynamically switching between a client mouse mode and a server mouse mode, in accordance with one embodiment of the invention.

FIG. 11 is a flow diagram illustrating a method 1100 for dynamically switching between a client mouse mode and a server mouse mode, in accordance with one embodiment of the invention. Method 1100 may be performed by processing logic that may comprise hardware (e.g., circuitry, dedicated logic, programmable logic, microcode, etc.), software (such as instructions run on a processing device), or a combination thereof. Method 1100 may be performed by a client computing device, a server computing device, or a system that includes both. In one embodiment, method 1100 is performed by a remote interface system 242, 244 of FIG. 2. In another embodiment, method 1100 is performed by a remote interface application 234, 236 of FIG. 2.

Referring to FIG. 11, at block 1105 a local computing device initiates a connection with a remote computing device. In one embodiment, the local computing device is a server and the remote computing device is a client. In another embodiment, the local computing device is a client and the remote computing device is a server. The connection may be initiated using a communication protocol such as RDP or SPICE.

At block 1110, the local computing device notifies the remote computing device of mouse modes supported by the local computing device. At block 1115, the local computing device receives notification of mouse modes supported by the remote computing device.

At block 1120, the local computing device determines whether the local computing device and the remote computing device both support multiple mouse modes. This includes determining which mouse modes are supported by both computing devices. The local computing device and the remote computing device may both support the same default mouse mode. However, both computing devices may not support additional mouse modes. In one embodiment, the default mouse mode is server mouse mode, and the additional mouse mode is client mouse mode. If both computing devices share the support of multiple mouse modes (e.g., if both support both client mouse mode and server mouse mode), the method continues to block 1125. If the two computing devices only share support for the default mouse mode, the method continues to block 1122, and the default mouse mode (mouse mode supported by both computing devices) is used to establish a cursor connection between the local computing device and the remote computing device.

At block 1125, the local computing device detects parameters of a connection between the local computing device and the remote computing device. These parameters may include latency, network traffic, available bandwidth, or other parameters. At block 1130, the local computing device determines whether the detected parameters satisfy criteria for a specific (non-default) mouse mode. In one embodiment, a remote interface system running on a server determines whether the detected parameters satisfy the criteria. In another embodiment, a remote interface application 234 running on a client determines whether the detected parameters satisfy the criteria. If the criteria are not satisfied, the method continues to block 1140, and a default mouse mode is used for the cursor connection. If the criteria are satisfied, the method proceeds to block 1135, and the client and server use the specific mouse mode for the cursor connection. In one embodiment, the default mouse mode is a client mouse mode, and the specific mouse mode is a server mouse mode. A specific criterion in one embodiment includes a latency that is below a latency threshold. The client and server in one embodiment negotiate the switch to the mouse mode such that both the server and the client perform the switch together. Other criteria may include, for example, identifying that a cursor capture was initiated by an application 254 in the guest 216, which requires using the server mouse mode.

If at block 1135 a cursor connection has already been established using a mouse mode other than the specific mouse mode (e.g., the cursor connection has been established using the default mouse mode), then the cursor connection is dynamically switched to the specific mouse mode. In one embodiment, the switch is negotiated between the local computing device and the remote computing device so that both devices make the switch concurrently. In one embodiment, this is achieved by performing the switch in the context of a distributed transaction, in which both devices must commit to the transaction before either device will perform the switch to the specific mouse mode.

In addition to automatically setting the mouse mode based on detected parameters, a user may also manually assign a mouse mode to use for the cursor connection. At block 1145, the local computing device determines whether it has received a user command to switch to a selected mouse mode. If no user command to switch mouse modes is received, the method continues to block 1155. If a user command to switch to a selected mouse mode is received, the method continues to block 1150. At block 1150, the server and client negotiate a switch to the selected mouse mode, at which point both the server and the client dynamically make the switch to the selected mouse mode. The switch may be negotiated in the same manner that automatic switches between mouse modes are performed.

At block 1155, the local computing device determines whether the connection with the remote computing device has terminated. If the connection has not terminated, the method returns to block 1125 to continue to detect parameters of the connection. If the parameters change, then the mouse mode may be automatically switched to the default mouse mode (block 1140) or to the specific mouse mode (block 1135). If the connection has terminated, the method ends.

Figure 12:
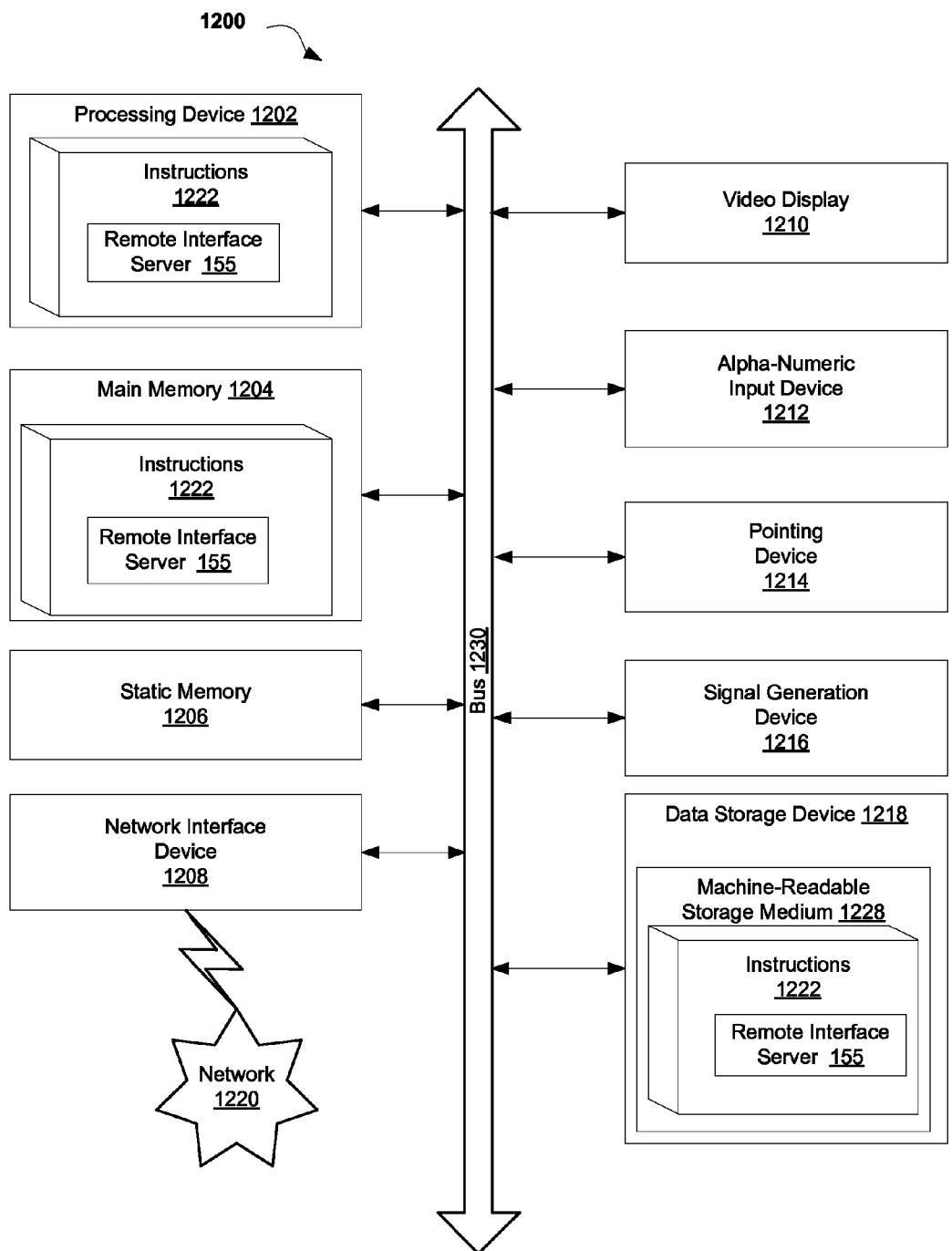
FIG. 12 illustrates a block diagram of one embodiment of a computer system.
Figure 11:
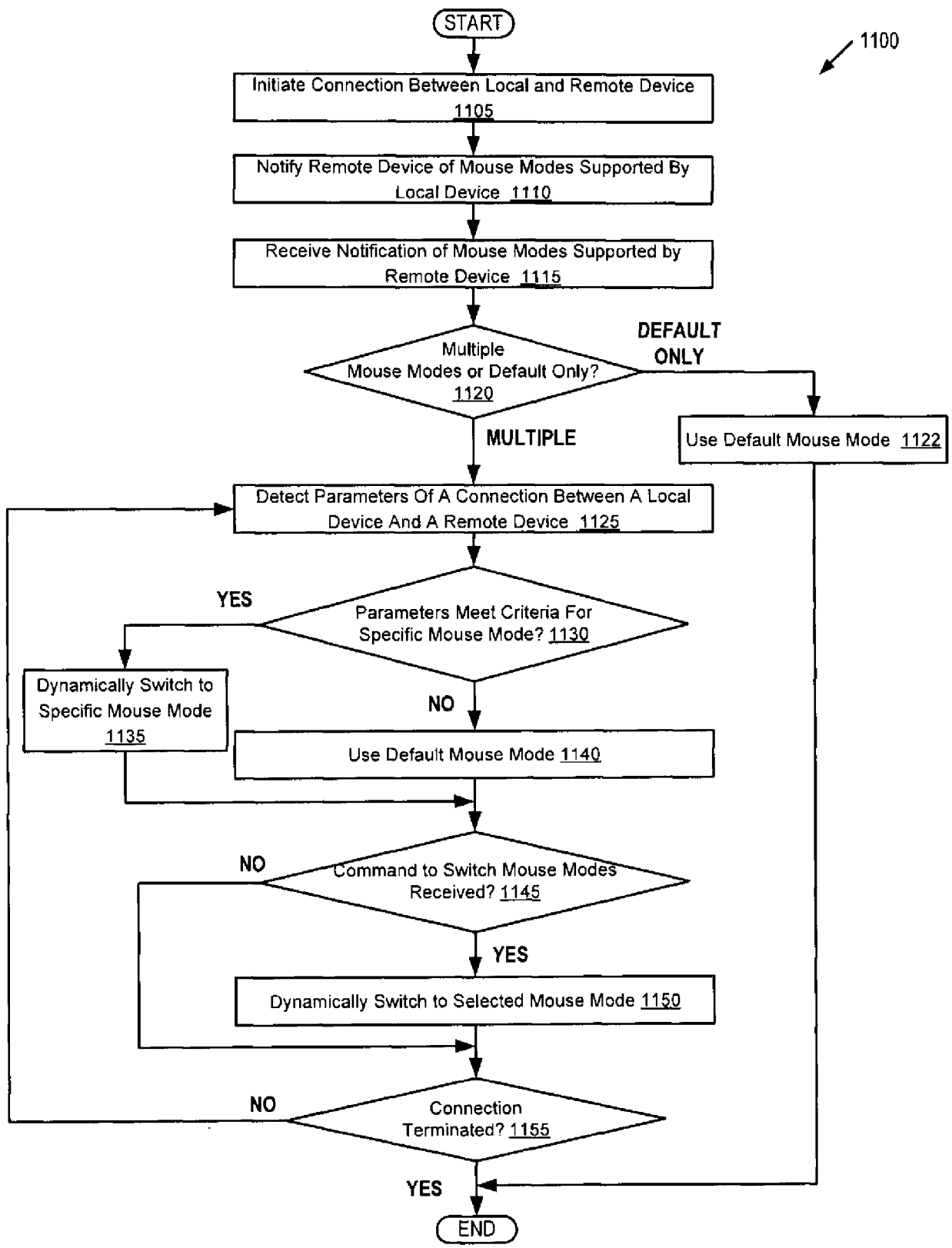

FIG. 12 illustrates a diagrammatic representation of a machine in the exemplary form of a computer system 1200 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) (such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute the processing logic (e.g., instructions 1222) for performing the operations and steps discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a pointing device 1214 (e.g., a mouse), and a signal generation device 1216 (e.g., a speaker).

The data storage device 1218 may include a machine-readable storage medium 1228 on which is stored one or more set of instructions 1222 (e.g., software) embodying any one or more of the methodologies of functions described herein. The instructions 1222 may also reside, completely or at least partially, within the main memory 1204 and/or within the processing device 1202 during execution thereof by the computer system 1200; the main memory 1204 and the processing device 1202 also constituting machine-readable storage media.

The machine-readable storage medium 1228 may also be used to store instructions for a remote interface server and/or a remote interface driver (e.g., remote interface server 155 and/or remote interface driver 145 of FIG. 1), and/or a software library containing methods that call the remote interface server and/or remote interface driver. Alternatively, the machine-readable storage medium 1228 may be used to store instructions for a remote interface application 140 and/or a software library containing methods that call the remote interface application 140. While the machine-readable storage medium 1228 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. A method, comprising:
responsive to determining that a plurality of mouse modes are supported by a local computing device and a remote computing device connected to the local computing device via a network, performing the following by the local computing device:
    detecting a parameter of a network connection between the local computing device and the remote computing device, the parameter comprising at least one of a network latency, network traffic or network bandwidth;
    responsive to determining that the parameter satisfies a criterion, setting a first mouse mode of the plurality of mouse modes for a first channel between the local computing device and the remote computing device, the first channel being associated with the network connection, wherein the first mouse mode is a synchronous mouse mode; and
    responsive to determining that the parameter fails to satisfy the criterion, setting a second mouse mode of the plurality of mouse modes for the first channel, wherein the second mouse mode is an asynchronous mouse mode;
wherein the plurality of mouse modes comprise connection protocols for the first channel, the connection protocols identifying when to send cursor messages between the local computing device and the remote computing device as well as what types of information to include in the cursor messages.

2. The method of claim 1, wherein the local computing device operates as a first one of a server and a client, and wherein the remote computing device operates as a second one of the server and the client.

3. The method of claim 2, wherein the synchronous mouse mode is a synchronous server mouse mode in which a cursor is controlled by the server and displayed at the client, and the asynchronous mouse mode is an asynchronous client mouse mode in which the cursor is controlled by the client and displayed at the client.

4. The method of claim 1, wherein the parameter satisfies the criterion, the method further comprising:
    detecting a change in the parameter that causes the parameter to no longer satisfy the criterion; and
    automatically switching from the first mouse mode to the second mouse mode for the first channel.

5. The method of claim 1, wherein the parameter fails to satisfy the criterion, the method further comprising:
    detecting a change in the parameter that causes the parameter to satisfy the criterion; and
    automatically switching from the second mouse mode to the first mouse mode for the first channel.

6. The method of claim 1, further comprising:
    identifying, by the local computing device, the plurality of mouse modes that are supported by both the local computing device and the remote computing device.

7. The method of claim 1, further comprising:
    receiving a user command to switch from a current mouse mode to a new mouse mode, wherein the current mouse mode is a first one of the first mouse mode and the second mouse mode, and the new mouse mode is a second one of the first mouse mode and the second mouse mode; and
    switching from the current mouse mode to the new mouse mode.

8. A non-transitory computer-readable storage medium including instructions that, when executed by a processing device of a local computing device, cause the processing device to perform operations comprising:
responsive to determining that a plurality of mouse modes are supported by the local computing device and a remote computing device connected to the local computing device via a network, performing the following by the processing device:
    detecting a parameter of a network connection between the local computing device and the remote computing device, the parameter comprising at least one of a network latency, network traffic or network bandwidth;
    responsive to determining that the parameter satisfies a criterion, setting a first mouse mode of the plurality of mouse modes for a first channel between the local computing device and the remote computing device, wherein the first mouse mode is a synchronous mouse mode; and
    responsive to determining that the parameter fails to satisfy the criterion, setting a second mouse mode of the plurality of mouse modes for the first channel, wherein the second mouse mode is an asynchronous mouse mode;
wherein the plurality of mouse modes comprise connection protocols for the first channel, the connection protocols identifying when to send cursor messages between the local computing device and the remote computing device as well as what types of information to include in the cursor messages.

9. The non-transitory computer-readable storage medium of claim 8, wherein the local computing device operates as a first one of a server and a client, and wherein the remote computing device operates as a second one of the server and the client.

10. The non-transitory computer-readable storage medium of claim 9, wherein the synchronous mouse mode is a synchronous server mouse mode in which a cursor is controlled by the server and displayed at the client, and the asynchronous mouse mode is an asynchronous client mouse mode in which the cursor is controlled by the client and displayed at the client.

11. The non-transitory computer-readable storage medium of claim 8, wherein the parameter satisfies the criterion, the operations further comprising:
    detecting a change in the parameter that causes the parameter to no longer satisfy the criterion; and
    automatically switching from the first mouse mode to the second mouse mode for the first channel.

12. The non-transitory computer-readable storage medium of claim 8, wherein the parameter fails to satisfy the criterion, the operations further comprising:
    detecting a change in the parameter that causes the parameter to satisfy the criterion; and
    automatically switching from the second mouse mode to the first mouse mode for the first channel.

13. The non-transitory computer-readable storage medium of claim 8, the operations further comprising:
    identifying, by the local computing device, the plurality of mouse modes that are supported by both the local computing device and the remote computing device.

14. The non-transitory computer-readable storage medium of claim 8, the operations further comprising:
    receiving a user command to switch from a current mouse mode to a new mouse mode, wherein the current mouse mode is a first one of the first mouse mode and the second mouse mode, and the new mouse mode is a second one of the first mouse mode and the second mouse mode; and switching from the current mouse mode to the new mouse mode.

15. A local computing device, comprising:
a memory to store instructions for controlling a mouse mode; and
a processing device, coupled to the memory, to execute the instructions, wherein the instructions cause the processing device to:
responsive to determining that a plurality of mouse modes are supported by the local computing device and a remote computing device connected to the local computing device via a network, perform the following:
detect a parameter of a network connection between the local computing device and the remote computing device, the parameter comprising at least one of a network latency, network traffic or network bandwidth;
responsive to determining that the parameter satisfies a criterion, set a first mouse mode of the plurality of mouse modes for a first channel between the local computing device and the remote computing device, wherein the first mouse mode is a synchronous mouse mode; and
responsive to determining that the parameter fails to satisfy the criterion, set a second mouse mode of the plurality of mouse modes for the first channel, wherein the second mouse mode is an asynchronous mouse mode;
wherein the plurality of mouse modes comprise connection protocols for the first channel, the connection protocols identifying when to send cursor messages between the local computing device and the remote computing device as well as what types of information to include in the cursor messages.

16. The local computing device of claim 15, wherein the local computing device operates as a first one of a server and a client, and wherein the remote computing device operates as a second one of the server and the client.

17. The local computing device of claim 16, wherein the synchronous mouse mode is a synchronous server mouse mode in which a cursor is controlled by the server and displayed at the client, and the asynchronous mouse mode is an asynchronous client mouse mode in which the cursor is controlled by the client and displayed at the client.

18. The local computing device of claim 15, wherein the parameter satisfies the criterion, further comprising the instructions to cause the processing device to:
detect a change in the parameter that causes the parameter to no longer satisfy the criterion; and
automatically switch from the first mouse mode to the second mouse mode for the first channel.

19. The local computing device of claim 15, wherein when the parameter initially fails to satisfy the criterion, further comprising the instructions to cause the processing device to:
detect a change in the parameter that causes the parameter to satisfy the criterion; and
automatically switch from the second mouse mode to the first mouse mode for the first channel.

20. The local computing device of claim 15, further comprising the instructions to cause the processing device to:
identify the plurality of mouse modes that are supported by both the local computing device and the remote computing device.

21. The local computing device of claim 15, further comprising the instructions to cause the processing device to:
receive a user command to switch from a current mouse mode to a new mouse mode, wherein the current mouse mode is a first one of the first mouse mode and the second mouse mode, and the new mouse mode is a second one of the first mouse mode and the second mouse mode; and
switch from the current mouse mode to the new mouse mode.

22. The method of claim 1, wherein the network connection comprises the first channel and a second channel, the first channel comprising a cursor channel for cursor messages and the second channel comprising a display channel for graphics messages.

23. The method of claim 22, wherein the display channel comprises a first display channel mapped to a first display device of the local computing device and a second display channel mapped to a second display device of the local computing device.

* * * * *

UNITED STATES PATENT AND TRADEMARK OFFICE
CERTIFICATE OF CORRECTION

PATENT NO. : 8,868,642 B2
APPLICATION NO. : 12/832873
DATED : October 21, 2014
INVENTOR(S) : Arnon Gilboa It is certified that error appears in the above-identified patent and that said Letters Patent is hereby corrected as shown below:

In the Drawings

Drawing sheet, consisting of Fig. 11, should be deleted to be replaced with the drawing sheet, consisting of Fig. 11, as shown on the attached page.

Signed and Sealed this
Fifth Day of May, 2015

Michelle K. Lee
*Director of the United States Patent and Trademark Office*